United States Patent
Kaku

(10) Patent No.: US 7,609,301 B2
(45) Date of Patent: Oct. 27, 2009

(54) MOTION IMAGE RECORDING DEVICE WITH COMPRESSION RATIO CONTROL

(75) Inventor: Junya Kaku, Hyogo (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 756 days.

(21) Appl. No.: 10/526,900

(22) PCT Filed: Sep. 3, 2003

(86) PCT No.: PCT/JP03/11280

§ 371 (c)(1),
(2), (4) Date: Mar. 7, 2005

(87) PCT Pub. No.: WO2004/025957

PCT Pub. Date: Mar. 25, 2004

(65) Prior Publication Data

US 2006/0153539 A1 Jul. 13, 2006

(30) Foreign Application Priority Data

Sep. 10, 2002 (JP) ............................. 2002-263769

(51) Int. Cl.
*H04N 5/76* (2006.01)
*H04N 5/225* (2006.01)
(52) U.S. Cl. .............. 348/231.2; 348/220.1; 348/222.1; 348/231.6; 348/231.9
(58) Field of Classification Search ............ 348/222.1, 348/207.99, 231.1, 231.6, 231.9
See application file for complete search history.

(56) References Cited

U.S. PATENT DOCUMENTS

| 6,470,413 B1* | 10/2002 | Ogawa | 711/103 |
| 6,590,607 B1* | 7/2003 | Taussig | 348/208.4 |
| 6,671,408 B1* | 12/2003 | Kaku | 382/232 |
| 6,968,119 B1* | 11/2005 | Kaku | 386/109 |
| 7,187,408 B2* | 3/2007 | Kaku | 348/231.6 |

(Continued)

FOREIGN PATENT DOCUMENTS

JP 10-164503 6/1998

(Continued)

OTHER PUBLICATIONS

Japan Office Action dated Dec. 18, 2007.

(Continued)

*Primary Examiner*—Ngoc-Yen T Vu
(74) *Attorney, Agent, or Firm*—Kratz, Quintos & Hanson, LLP

(57) ABSTRACT

A digital video camera (10) includes a CPU (52) mounting a multitasking OS. A plurality of frames of YUV data forming a motion image are recorded in a recording medium (50) in a compressed manner under the control of the CPU 52. Here, a plurality of tasks to be executed by the CPU (52) includes an imaging processing task in relation to a compression process of the plurality frames of the YUV data and a BG processing task in relation to a recording process of a plurality of frames of JPEG data. Furthermore, the imaging processing task includes a determining process for periodically determining a recording processing speed of the JPEG data and a changing process for changing a compression ratio of the YUV data on the basis of the determination result.

9 Claims, 20 Drawing Sheets

U.S. PATENT DOCUMENTS

2002/0191866 A1 * 12/2002 Tanabe ..................... 382/298

FOREIGN PATENT DOCUMENTS

| | | | |
|---|---|---|---|
| JP | 11-331673 | | 11/1999 |
| JP | 2000-184330 | | 6/2000 |
| JP | 2000-236467 | * | 8/2000 |
| JP | 2000-253360 | | 9/2000 |
| JP | 2001-025011 | | 1/2001 |
| JP | 2001-36904 | | 2/2001 |
| JP | 2001-136429 | | 5/2001 |
| JP | 2001-320705 | * | 11/2001 |
| JP | 2001320705 A | * | 11/2001 |
| JP | 2002-237984 | | 8/2002 |
| JP | 2002-247509 | | 8/2002 |

OTHER PUBLICATIONS

Japan Office Action dated Apr. 30, 2008.

* cited by examiner

| |
|---|
| POSITION INFORMATION OF AUDIO DATA 0 |
| SIZE INFORMATION OF AUDIO DATA 0 |
| POSITION INFORMATION OF JPEG DATA 0 |
| SIZE INFORMATION OF JPEG DATA 0 |
| POSITION INFORMATION OF JPEG DATA 1 |
| SIZE INFORMATION OF JPEG DATA 1 |
| POSITION INFORMATION OF JPEG DATA 2 |
| SIZE INFORMATION OF JPEG DATA 2 |
| POSITION INFORMATION OF AUDIO DATA 1 |
| SIZE INFORMATION OF AUDIO DATA 1 |
| POSITION INFORMATION OF JPEG DATA 3 |
| SIZE INFORMATION OF JPEG DATA 3 |
| POSITION INFORMATION OF JPEG DATA 4 |
| SIZE INFORMATION OF JPEG DATA 4 |
| POSITION INFORMATION OF JPEG DATA 5 |
| SIZE INFORMATION OF JPEG DATA 5 |
| ⋮ |
| POSITION INFORMATION OF JPEG DATA n-1 |
| SIZE INFORMATION OF JPEG DATA n-1 |
| POSITION INFORMATION OF JPEG DATA n |
| SIZE INFORMATION OF JPEG DATA n |
| |

| LIST NUMBER | COMMAND | PARAMETER 1 | PARAMETER 2 | PARAMETER 3 | PARAMETER 4 |
|---|---|---|---|---|---|
| 0 | | | | | |
| 1 | | | | | |
| 2 | | | | | |
| 3 | | | | | |
| 4 | | | | | |
| 5 | | | | | |
| ⋮ | ⋮ | ⋮ | ⋮ | | ⋮ |
| L-1 | | | | | |
| L | | | | | |

| i | JPEG RAW DATA | | JPEG HEADER | | SOUND DATA | |
|---|---|---|---|---|---|---|
| | SDRAM ADDRESS | DATA SIZE | SDRAM ADDRESS | DATA SIZE | SDRAM ADDRESS | DATA SIZE |
| 0 | | | | | | |
| 1 | | | | | | |
| 2 | | | | | | |
| 3 | | | | | | |
| 4 | | | | | | |
| 5 | | | | | | |
| ⋮ | ⋮ | ⋮ | ⋮ | ⋮ | ⋮ | ⋮ |

52c

|  | HEAD ADDRESS | FREE SPACE SIZE |
|---|---|---|
| ① | 48 | 503 |
| ② | 96 | 268 |
| ③ | 71 | 245 |
| ④ | 3 | 32 |
|  |  |  |
|  |  |  |
|  |  |  |

FIG. 9(A)

| |
|---|
| POSITION INFORMATION OF JPEG DATA P |
| SIZE INFORMATION OF JPEG DATA P |

FIG. 9(B)

| | |
|---|---|
| POSITION INFORMATION OF JPEG DATA P | |
| SIZE INFORMATION OF JPEG DATA P | |
| POSITION INFORMATION OF JPEG DATA P | } 1 FRAME INTERPOLATION |
| SIZE INFORMATION OF JPEG DATA P | |

FIG. 9(C)

| |
|---|
| POSITION INFORMATION OF JPEG DATA P |
| SIZE INFORMATION OF JPEG DATA P |
| POSITION INFORMATION OF JPEG DATA P |
| SIZE INFORMATION OF JPEG DATA P |
| POSITION INFORMATION OF JPEG DATA P+1 |
| SIZE INFORMATION OF JPEG DATA P+1 |

FIG. 10 (A)

| i | JPEG RAW DATA | | JPEG HEADER | |
|---|---|---|---|---|
| | SDRAM ADDRESS | DATA SIZE | SDRAM ADDRESS | DATA SIZE |
| P | P-th FRAME | P-th FRAME | P-th FRAME | P-th FRAME |
| P+1 | | | | |
| P+2 | | | | |

FIG. 10 (B)

| i | JPEG RAW DATA | | JPEG HEADER | |
|---|---|---|---|---|
| | SDRAM ADDRESS | DATA SIZE | SDRAM ADDRESS | DATA SIZE |
| P | P-th FRAME | P-th FRAME | P-th FRAME | P-th FRAME |
| P+1 | P-th FRAME | P-th FRAME | P-th FRAME | P-th FRAME |
| P+2 | | | | |

} 1 FRAME INTERPOLATION

FIG. 10 (C)

| i | JPEG RAW DATA | | JPEG HEADER | |
|---|---|---|---|---|
| | SDRAM ADDRESS | DATA SIZE | SDRAM ADDRESS | DATA SIZE |
| P | P-th FRAME | P-th FRAME | P-th FRAME | P-th FRAME |
| P+1 | P-th FRAME | P-th FRAME | P-th FRAME | P-th FRAME |
| P+2 | P+1-th FRAME | P+1-th FRAME | P+1-th FRAME | P+1-th FRAME |

FIG. 11(A)

| |
|---|
| POSITION INFORMATION OF JPEG DATA P |
| SIZE INFORMATION OF JPEG DATA P |
| POSITION INFORMATION OF JPEG DATA P+1 |
| SIZE INFORMATION OF JPEG DATA P+1 |

FIG. 11(B)

| |
|---|
| POSITION INFORMATION OF JPEG DATA P |
| SIZE INFORMATION OF JPEG DATA P |
| POSITION INFORMATION OF JPEG DATA P+2 |
| SIZE INFORMATION OF JPEG DATA P+2 |

} 1 FRAME THINNING

FIG. 11(C)

| |
|---|
| POSITION INFORMATION OF JPEG DATA P |
| SIZE INFORMATION OF JPEG DATA P |
| POSITION INFORMATION OF JPEG DATA P+2 |
| SIZE INFORMATION OF JPEG DATA P+2 |
| POSITION INFORMATION OF JPEG DATA P+3 |
| SIZE INFORMATION OF JPEG DATA P+3 |

FIG. 12(A)

| i | JPEG RAW DATA | | JPEG HEADER | |
|---|---|---|---|---|
| | SDRAM ADDRESS | DATA SIZE | SDRAM ADDRESS | DATA SIZE |
| P | P-th FRAME | P-th FRAME | P-th FRAME | P-th FRAME |
| P+1 | P+1-th FRAME | P+1-th FRAME | P+1-th FRAME | P+1-th FRAME |
| P+2 | | | | |

FIG. 12(B)

| i | JPEG RAW DATA | | JPEG HEADER | | |
|---|---|---|---|---|---|
| | SDRAM ADDRESS | DATA SIZE | SDRAM ADDRESS | DATA SIZE | |
| P | P-th FRAME | P-th FRAME | P-th FRAME | P-th FRAME | |
| P+1 | P+2-th FRAME | P+2-th FRAME | P+2-th FRAME | P+2-th FRAME | } 1 FRAME THINNING |
| P+2 | | | | | |

FIG. 12(C)

| i | JPEG RAW DATA | | JPEG HEADER | |
|---|---|---|---|---|
| | SDRAM ADDRESS | DATA SIZE | SDRAM ADDRESS | DATA SIZE |
| P | P-th FRAME | P-th FRAME | P-th FRAME | P-th FRAME |
| P+1 | P+2-th FRAME | P+2-th FRAME | P+2-th FRAME | P+2-th FRAME |
| P+2 | P+3-th FRAME | P+3-th FRAME | P+3-th FRAME | P+3-th FRAME |

MOTION IMAGE RECORDING DEVICE WITH COMPRESSION RATIO CONTROL

TECHNICAL FIELD

The present invention relates to motion image recording apparatuses. More specifically, the present invention relates to a motion image recording apparatus that is applied to a video camera, and stores a motion image signal in a recording medium in a compressed manner.

PRIOR ART

An example of such a kind of conventional video camera is disclosed in a Japanese Patent Laying-open No. 2000-184330 laid-open on Jun. 30, 2000. According to this prior art, a compression ratio of a still image signal of a next frame is calculated on the basis of a compression ratio, a compression size, and a target size of a still image signal of a current frame forming a motion image, and whereby, a time period required for a compression process of each frame is shortened.

However, in the prior art, a target size is fixed, and therefore, with respect to a recording medium of a low recording speed, it takes too much time to record a compressed still image signal of each frame. That is, in the prior art, there is a problem that a successive recordable time period of a motion image depends on recording characteristics of a recording medium.

SUMMARY OF THE INVENTION

Therefore, it is a primary object of the present invention to provide a motion image recording apparatus capable of controlling a successive recordable time of a motion image.

A motion image recording apparatus according to this invention is provided with a processor mounting a multitasking OS, and records a motion image signal in a compressed manner in a recording medium, wherein a plurality of tasks to be executed by the processor includes a first task in relation to a compression process of the motion image signal, and a second task in relation to a recording process of a compressed motion image signal, wherein the first task includes a determining process for periodically determining a recording processing speed of the compressed motion image signal and a changing process for changing a compression ratio of the motion image signal on the basis of a determination result of the determining process.

The motion image signal is recorded in the recording medium in a compressed manner under the control of the processor mounting a multitasking OS. Here, the plurality of tasks to be executed by the processor includes the first task in relation to the compression process of the motion image signal and the second task in relation to the recording process of the compressed motion image signal. Furthermore, the first task includes the determining process for periodically determining the recording processing speed of the compressed motion image signal, and a changing process for changing the compression ratio of the motion image signal according to the determination result.

In the multitasking OS, each of the plurality of tasks is executed only in a time division manner. Then, the recording processing speed of the compressed image signal is changed according to load changes of each of the tasks. Here, this is the reason why the recording processing speed is periodically determined, and the compression ratio of the motion image signal is changed according to the determination result. Thus, it is possible to control a successive recordable time of the motion image.

Preferably, the second task includes a transmission process for transmitting the compressed motion image signal to the recording medium by a defined amount. When another task is executed, the second task is interrupted each time that a transmission by the defined amount is completed.

In a case that the motion image signal is fetched according to a fetching condition of the motion image signal, the plurality of tasks further includes a third task in relation to an adjustment of the fetching condition. In a case that the fetching condition is controlled by the third task, the adjustment process becomes a change factor of the recording processing speed.

Preferably, the fetching means includes an imaging means for imaging an object, and the fetching condition includes an imaging condition of the imaging means. In this case, whether or not an adjustment of the imaging condition is necessary depends on an external factor such as brightness, tone, etc. of an object. The third task is activated at an arbitrary timing, and this causes changes of the recording processing speed.

In a case that the compressed motion image signal is temporarily stored in the memory, the determining means preferably determines the recording processing speed on the basis of a size of the compressed motion image signal that is stored in the memory and has not yet been recorded.

A motion image recording apparatus according to this invention, comprising: a fetching means for fetching a motion image signal; a compression means for compressing the motion image signal by a predetermined number of screens to generate a compressed motion image signal; a recording means for recording the compressed motion image signal in a recording medium; a determining means for periodically determining a processing speed of the recording means; and a changing means for changing a compression ratio of the compression means on the basis of a determination result by the determining means.

The motion image signal fetched by the fetching means is compressed by the predetermined number of screens by the compression means. The compressed motion image signal is recorded in the recording medium by the recording means. The processing speed of the recording means is periodically determined by the determining means, and the changing means changes the compression ratio of the compression means on the basis of the determination result by the determining means. Thus, it is possible to control the successive recordable time of the motion image.

Preferably, a bus connected to the memory is utilized for transmitting the motion image signal and the compressed motion image signal. The zooming means performs an electronic zooming process on the motion image signal in a manner selected by the selecting means. The zooming means, when an enlargement zooming is selected by the selecting means, extracts a part of the motion image signal by use of the memory, and performs an enlargement zooming on the extracted motion image signal. Accordingly, when the enlargement zoom is selected, the bus is used for transmitting the motion image signal, and therefore, an occupation ratio of the bus for transmitting the compressed motion image signal, that is, a processing speed of the recording means is decreased.

In a case of temporarily storing the compressed motion image signal in the memory, the determining means preferably determines the processing speed on the basis of a size of the compressed motion image signal that is stored in the memory and has not yet been recorded.

The above described objects and other objects, features, aspects and advantages of the present invention will become

BRIEF DESCRIPTION OF THE DRAWINGS

FIG. 3 is an illustrative view showing another example of the mapping state of the SDRAM;

FIG. 4 is an illustrative view showing one example of a configuration of an instruction list;

FIG. 5 is an illustrative view showing one example of a configuration of an access information table;

FIG. 9(A) is an illustrative view showing a part of an index information creating process;

FIG. 9(B) is an illustrative view showing another part of the index information creating process;

FIG. 9(C) is an illustrative view showing the other part of the index information creating process;

FIG. 10(A) is an illustrative view showing a part of an access information table creating process;

FIG. 10(B) is an illustrative view showing another part of the access information table creating process;

FIG. 10(C) is an illustrative view showing the other part of the access information table creating process;

FIG. 11(A) is an illustrative view showing a part of the index information creating process;

FIG. 11(B) is an illustrative view showing another part of the index information creating process;

FIG. 11(C) is an illustrative view showing the other part of the index information creating process;

FIG. 12(A) is an illustrative view showing a part of the access information table creating process;

FIG. 12(B) is an illustrative view showing another part of the access information table creating process;

FIG. 12(C) is an illustrative view showing the other part of the access information table creating process;

BEST MODE FOR PRACTICING THE INVENTION

Figure 1:
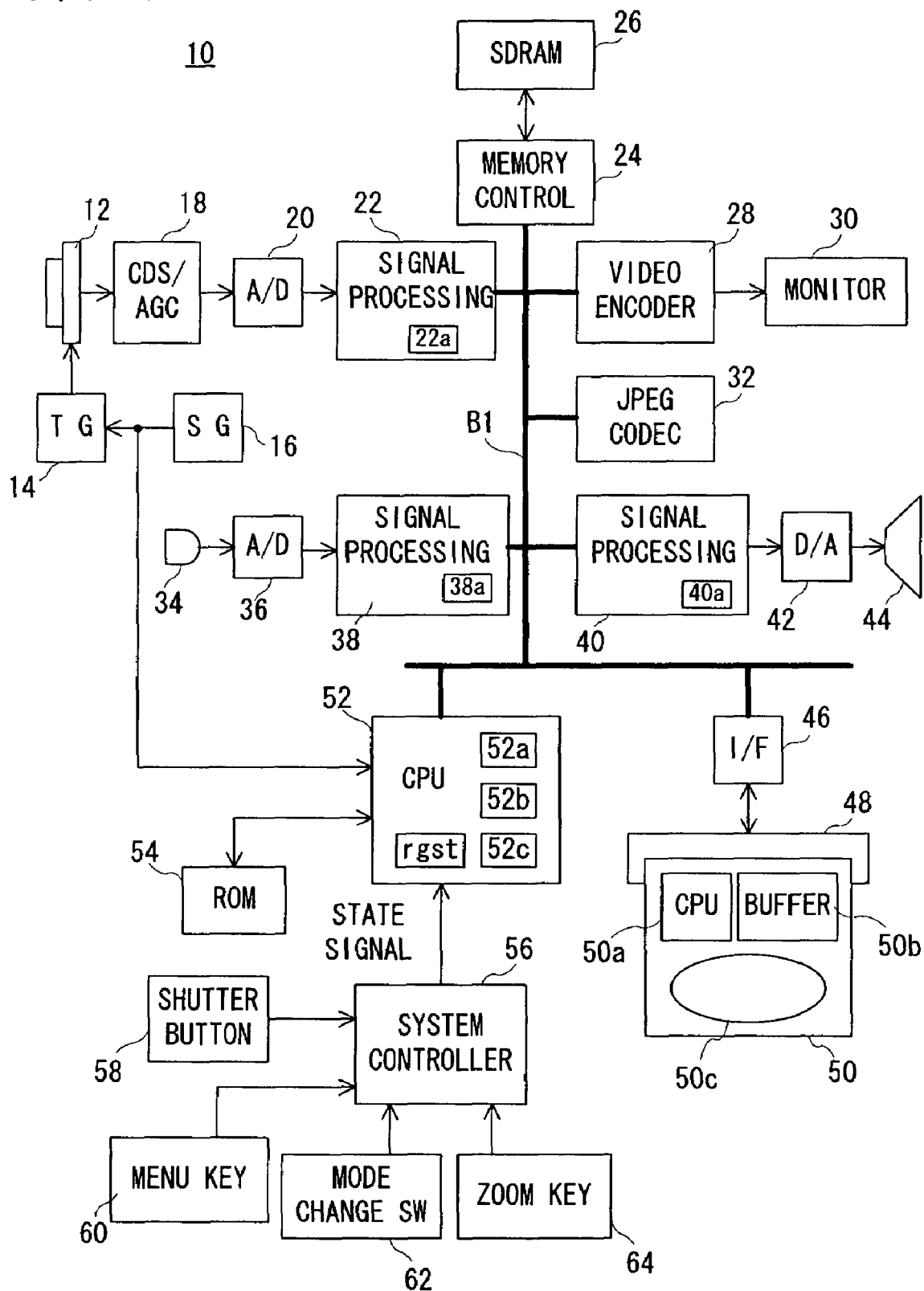
FIG. 1 is a block diagram showing one embodiment of the present invention.

Referring to FIG. 1, a digital video camera 10 of this embodiment includes an image sensor 12. An aperture unit and an optical lens that are not shown are placed at a front of the image sensor 12, and an optical image of an object is irradiated onto the image sensor 12 through these members.

When an imaging mode is selected by a mode change switch 62, a corresponding state signal is applied from a system controller 56 to a CPU 52. The CPU 52 is a multitasking CPU mounting a multitasking OS such as μITRON, and executes a plurality of tasks such as an imaging processing task, an imaging condition controlling task, a BG (Back Ground) processing task, etc. in parallel in the imaging mode. More specifically, each of the tasks is executed in a time division manner according to a priority set in advance and in response to a vertical synchronization signal described later In the imaging processing task, an operator can select a desired imaging mode from a plurality of imaging modes by operating a menu key 60. Any one of a resolution and a frame rate of a captured image, and an audio system, a bit rate and a sampling rate of a fetched audio is different for each imaging mode. When the desired imaging mode is selected, a corresponding information signal is applied to the CPU 52 from the system controller 56. The CPU 52 stores the imaging mode information (resolution, frame rate, audio system, bit rate, sampling rate) indicative of a selected imaging mode and a filename of a movie file to be created from now in a register rgst.

The CPU 52 further instructs a timing generator (TG) 14 to image at the resolution and the frame rate indicated by the imaging mode information. The TG 14 generates a timing signal according to the desired imaging mode (resolution, frame rate) on the basis of the vertical synchronization signal and a horizontal synchronization signal output from a signal generator (SG) 16, and drives the image sensor 12 in a raster scan manner. A raw image signal (electric charge) having the desired resolution is output at the desired frame rate from the image sensor 12, and the output raw image signal is input to a signal processing circuit 22 as raw image data being a digital signal through a CDS/AGC circuit 18 and an A/D converter 20.

When a set zoom magnification is "1.0", the signal processing circuit 22 performs a series of signal processing such as a white balance adjustment, a color separation, a YUV conversion, etc. on the raw image data input from the A/D converter 20 to generate YUV data of 1.0 times. When the set zoom magnification is less than "1.0", the raw image data input from the A/D converter 20 is first subjected to a reduction zoom by a zoom circuit 22a, and subjected to the above-described series of signal processing after the reduction zoom. The YUV data generated by such the processing is stored in the SDRAM 26 via a bus B1 and a memory control circuit 26.

On the other hand, when the set zoom magnification is larger than "1.0", that is, when an enlargement zooming process is necessary, the zoom circuit 22a first temporarily writes the raw image data input from the A/D converter 20 through the bus B1 and the memory control circuit 24 to the SDRAM 26. The zoom circuit 22a succeedingly reads the raw image data in a part of area required for an enlargement zooming process through the bus B1 and the memory control circuit 24 to perform an enlargement zoom on the read raw image data in the part of area. The enlarged raw image data is converted into the YUV data by the above-described series of signal processing. Thus, the YUV data having a magnification larger than "1.0" is generated. The generated YUV data is stored in the SDRAM 26 via the bus B1 and the memory control circuit 26.

A video encoder 28 reads the YUV data from the SDRAM 26 through the bus B1 and the memory control circuit 24 to encode the read YUV data into a composite image signal. The encoded composite image signal is applied to a monitor 30, and whereby, a real-time motion image (through-image) of the object is displayed on the monitor 30.

In the imaging condition controlling task, the CPU 52 controls an imaging condition such as an aperture amount, an exposure time period, a white balance adjustment gain, an electronic zoom magnification, etc. More specifically, the aperture amount or the exposure time period is adjusted according to brightness of the object, the white balance adjustment gain is corrected according to a color of the object, and the electronic zoom magnification is adjusted according to changes of a state signal indicative of an operating state of a zoom key 64. Thus, it is possible to prevent the brightness and the tone of the through-image from changing, and the zoom magnification of the through-image is changed in response to the operation of the zoom key 64.

It is noted that when the zoom magnification larger than "1.0" is selected by the zoom key 64, a process of temporarily storing the raw image data in the SDRAM 26 as described above is executed.

Figures 6, 7:
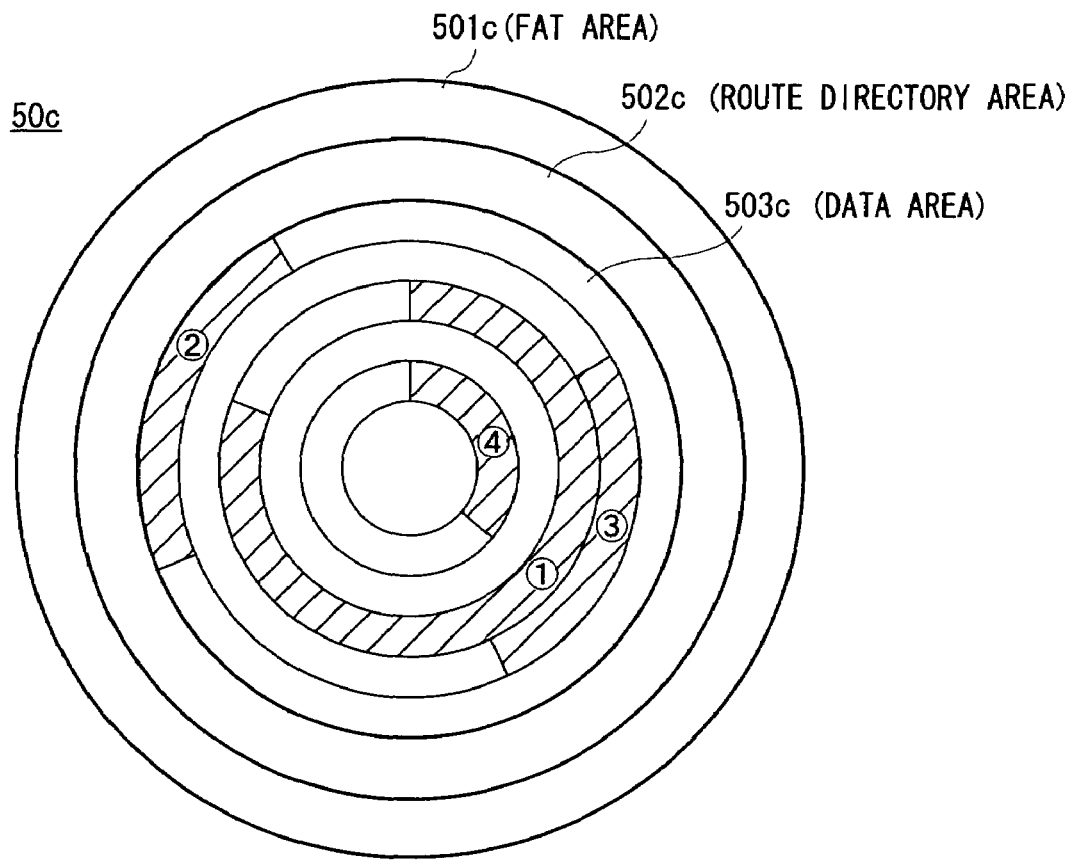
FIG. 6 is an illustrative view showing one example of a configuration of a recording medium.
FIG. 7 is an illustrative view showing one example of a configuration of a free area table.

When a shutter button 58 is depressed by the operator, and a corresponding state signal is applied from the system controller 56, the CPU 52 creates a movie file storing a captured motion image in a recording medium 50. Here, the recording medium 50 is a detachable recording medium, and becomes accessible by an I/F 46 when being loaded into a slot 48. The recording medium 50 is provided with a CPU 50*a*, a buffer memory 50*b* and a hard disk 50*c*, and an FAT area 501*c*, a root directory area 502*c* and a data area 503*c* are formed in the hard disk 50*c* as shown in FIG. 6. Writing of the data to the data area 503*c* is performed by a predetermined amount via the buffer memory 50*b*.

At a time of recording the motion image, the CPU 52 activates the BG processing task. At this time, an instruction list 52*a* shown in FIG. 4 is created in order to enable a smooth process between the imaging processing task and the BG processing task.

In the instruction list 52*a*, first, a command and parameters corresponding to each of "BG processing start", "file creation", "table creation" and "file open" are set. The BG processing task is started by "BG processing start", and a filename of the movie file and size information indicative of "0" are written to the root directory area 502*c* shown in FIG. 6 by "file creation". In "table creation", a free area table 52*c* as shown in FIG. 7 is created. According to FIG. 7, a head address and a size of each of the free areas formed in the data area 503*c* are set in descending order of the size. In "file open", a handle number for specifying the movie file to which the data is written is created.

When preparing for writing the data is thus completed, the CPU 52 performs a thumbnail image capturing process and a header information creating process in order to create a movie file header during next one frame period. First, the signal processing circuit 22 is instructed to perform a thinning-out process, and a JPEG codec 32 is instructed to perform a compression process. The signal processing circuit 22 performs the thinning-out process in addition to the above-described YUV conversion, and writes thumbnail YUV data thus generated to the SDRAM 26 through the bus B1 and the memory control circuit 24. The JPEG codec 32 reads the thumbnail YUV data from the SDRAM 26 through the bus B1 and the memory control circuit 24, and performs a JPEG compression on the read thumbnail YUV data. The JPEG codec 32 then writes JPEG raw data Rth of the thumbnail image generated by the JPEG compression to the SDRAM 26 through the bus B1 and the memory control circuit 24.

Figure 2:
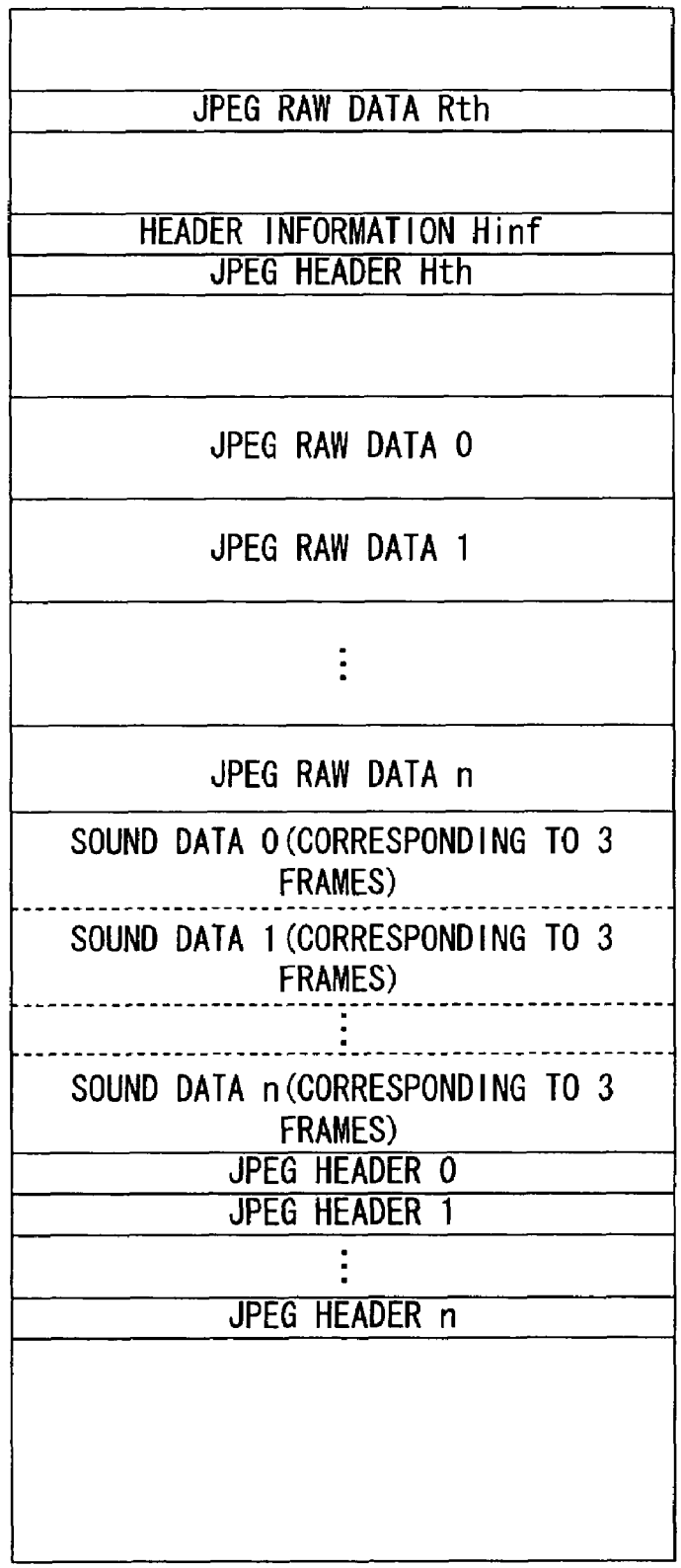
FIG. 2 is an illustrative view showing one example of a mapping state of an SDRAM.

The CPU 46 creates a JPEG header Hth of the thumbnail image by itself and, and writes the created JPEG header Hth to the SDRAM 26 through the bus B1 and the memory control circuit 24. The CPU 46 further creates for itself header information Hinf including the above-described imaging mode information, and writes the created header information Hinf to the SDRAM 26 through the bus B1 and the memory control circuit 24. Thus, the JPEG raw data Rth, the JPEG header Hth and the header information Hinf are mapped into the SDRAM 26 as shown in FIG. 2.

In the instruction list 52*a*, "file writing" is set. "File writing" is executed by the BG process, and whereby, the JPEG raw data Rth, the JPEG header Hth and the header information Hinf are read from the SDRAM 26, and applied to the recording medium 50 via the bus B1 and the I/F circuit 46. Thus, a movie file header shown in FIG. 7 is created in the data area 503*c* shown in FIG. 6. It is noted that JPEG data TH shown in FIG. 7 is formed of the JPEG header Hth and the JPEG raw data Rth.

After completion of creating the movie file header, the CPU 52 performs an image capturing process and an audio fetching process every time that a vertical synchronization signal is generated.

In the image capturing process, the created JPEG header is written to the SDRAM 26 through the bus B1 and the memory control circuit 24, and an compression instruction is applied to the JPEG codec 32. The JPEG codec 32, when the compression instruction is applied, reads YUV data of the current frame from the SDRAM 26 through the bus B1 and the memory control circuit 24, and compresses the read YUV data up to a target size. When JPEG raw data of the current frame is crated by the compression process, the JPEG codec 32 writes the JPEG raw data to the SDRAM 26 through the bus B1 and the memory control circuit 24.

Here, the target size at a time of the JPEG compression is changed according to a recording state to the recording medium 50. That is, if a recording processing speed is low, there is a possibility of a failure of the process due to a bottle neck, and therefore, the recording state of the recording medium 50 is periodically detected, and the target size at a time of the JPEG compression is changed according to the detection result. The target size changing process is described later in detail.

In the audio fetching process, a processing instruction is applied to a signal processing circuit 38. The signal processing circuit 38, when the processing instruction is applied, writes audio data corresponding to one frame accumulated in an SRAM 38*a* to the SDRAM 26 through the bus B1 and the memory control circuit 38*a*. As a result of execution of such the image capturing process and the audio fetching process every one frame period, the JPEG header, the JPEG raw data and the audio data of each frame are mapped into the SDRAM 26 as shown FIG. 2.

Figure 8:
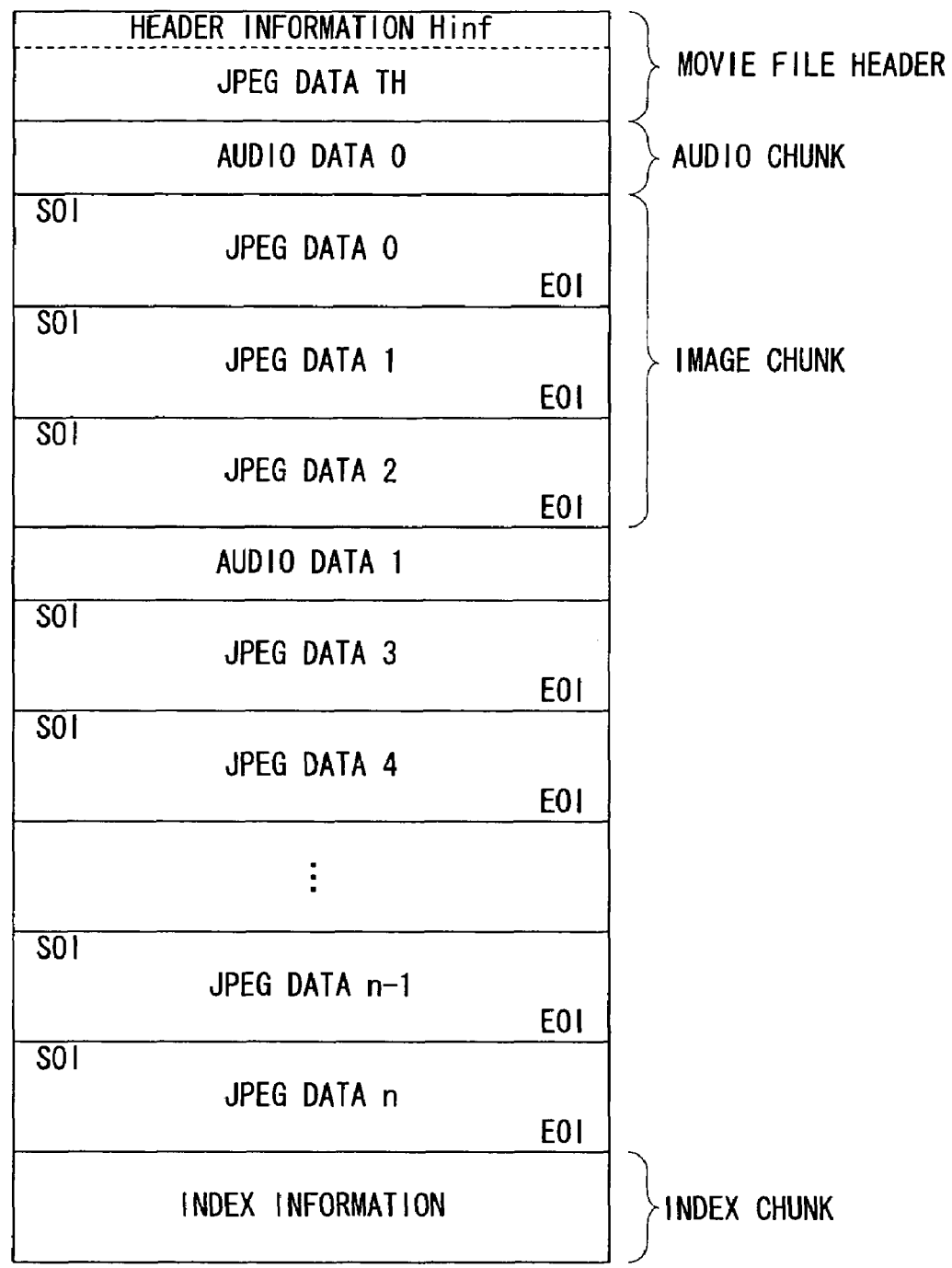
FIG. 8 is an illustrative view showing a configuration of a movie file in a complete state.

It is noted that in FIG. 2, a serial number 0, 1, 2, . . . is applied to the JPEG header and the JPEG raw data for each frame while the serial number 0, 1, 2, . . . is applied to the audio data for each three frames. Furthermore, one frame of JPEG data is formed by the JPEG header and the JPEG raw data each having the same number, and markers SOI (Start Of Image) and EOI (End Of Image) are assigned to the head and the end of the JPEG data of each frame as shown in FIG. 8.

The CPU 52 further creates access information of the JPEG raw data, access information of the JPEG header and index information of the JPEG data every time that one frame period elapses, and creates access information of the audio data and index information of the audio data every time that three frames of period elapses.

The access information of the JPEG raw data consists of a data size of each frame and a head address on the SDRAM 26, and the access information of the JPEG header also consists of a data size of each frame and a head address on the SDRAM 26. The index information of the JPEG data consists of a data size of each frame and a distance from the head of a movie file at a time of being written to the recording medium 50.

The access information of the audio data consists of a data size corresponding to three frames and a head address on the SDRAM 26, and the index information of the audio data consists of a data size corresponding to three frames and a distance from the head of the movie file at a time of being written to the recording medium 50.

The access information is created in an access information table 52b shown in FIG. 5, and the index information is created in the SDRAM 26 as shown in FIG. 3. According to FIG. 5, the SDRAM address and the data size of three frames of the JPEG raw data, the SDRAM address and the data size of three frames of JPEG header, and the SDRAM address and the data size of the audio data corresponding to three frames are related with each other. According to FIG. 3, position information and size information of the audio data corresponding to three frames, and position information and size information of three frames of the JPEG data are alternately mapped into the SDRAM 26.

It is noted that it may be possible that an error of a sampling frequency of the audio data occurs between a real processing by hardware and calculation of software. In this embodiment, the index information and the access information of the JPEG data are subjected to the thinning-out/interpolation in order to complement the difference. The thinning-out/interpolation process is described later in detail.

The CPU 52 sets "file writing" to the instruction list 52a on the basis of the above-described access information in order to write the audio data corresponding to three frames and the JPEG data of three frames to the recording medium 50. "File writing" is executed by the BG processing, and whereby, the audio data corresponding to three frames and the JPEG data of three frames are read from the SDRAM 26, and applied to the recording medium 50 via the bus B1 and the I/F circuit 46. In the data area 503c of the recording medium 50, an audio chunk consisting of the audio data corresponding to three frames and an image chunk consisting of the JPEG data of three frames are recorded. As shown in FIG. 8, the audio chunk and the image chunk are alternately mapped on the movie file.

When the shutter button 58 is depressed once again, the CPU 52 suspends the image capturing and the audio fetching, and sets "file writing" to the instruction list 52a in order to record the index information created in the SDRAM 26 as shown in FIG. 3 into the recording medium 50. "File writing" is executed by the BG processing task, and whereby the index information is read from the SDRAM 26, and applied to the recording medium 50 via the bus B1 and the I/F circuit 46. Thus, an index chunk shown in FIG. 8 is formed at the end of the movie file. As to the index chunk, a position in the file and a size of the audio data are managed every time period corresponding to three frames, and a position in the file and a size of the JPEG data are managed every one frame.

After completion of creating the index chunk, the CPU 52 calculates a total size value of the movie file currently created, and sets "file writing" to the instruction list 52a in order to write the calculated total size value to the movie file header. The file writing is executed by the BG processing task, and whereby, the total size value is added to the header information Hinf of the movie file header to complete the creation of the movie file satisfying the QuickTime format.

Succeedingly, the CPU 52 sets "file close" and "BG processing termination" to the instruction list 52a. When "file close" is executed by the BG processing, size information written in the root directory area 502c and FAT information written in the FAT area 501c are updated. More specifically, a filename of a movie file currently created is detected from a directory entry, and the size information assigned to the detected filename is updated from "0" to the total size value. Furthermore, the FAT information is updated such that a link is formed in a writing area (cluster) of the movie file currently created. The BG process is terminated by "BG processing termination".

When a reproduction mode is selected by the mode change switch 62, and a desired movie file is selected by the menu key 60, a corresponding state signal is applied to the system controller 56. The CPU 52 detects the selected movie file from the recording medium 50, and reproduces audio data and JPEG data within the detected movie file. At this time, a reproducing order complies with the index information within the movie file.

In case the index information created as shown in FIG. 3 exists within the movie file, the audio data and the JPEG data are read from the recording medium 50 in the order of the audio data 0, the JPEG data 0-2, the audio data 1, the JPEG data 3-5, . . . . The read audio data and JPEG data are first stored in the SDRAM 26 by the memory control circuit 24. The CPU 52 applies an expansion instruction to the JPEG codec 32 according to the order of the index information of the JPEG data, and applies a processing instruction to the signal processing circuit 40 in the order according to the index information of the audio data.

The JPEG codec 32 reads JPEG raw data forming JPEG data of a desired frame from the SDRAM 26 through the bus B1 and the memory control circuit 24, and performs a JPEG expansion on the read JPEG raw data. YUV data generated by the JPEG expansion is stored in the SDRAM 26 through the bus B1 and the memory control circuit 24, and then applied to the video encoder 28 through the bus B1 and the memory control circuit 24. Thus, a corresponding reproduced image is displayed on the monitor 30.

The signal processing circuit 40 reads the audio data corresponding to desired three frames from the SDRAM 26 through the bus B1 and the memory control circuit 24, and accumulates the read audio data in the SRAM 40a. The audio data accumulated in the SRAM 40a is converted into an analog audio signal by a D/A converter 42, and the converted audio signal is output from a speaker 44.

By repeating such the processes, a reproduced motion image is displayed on the monitor 30, and an audio signal synchronizing to the reproduced motion image is output from the speaker 44.

Figure 20:
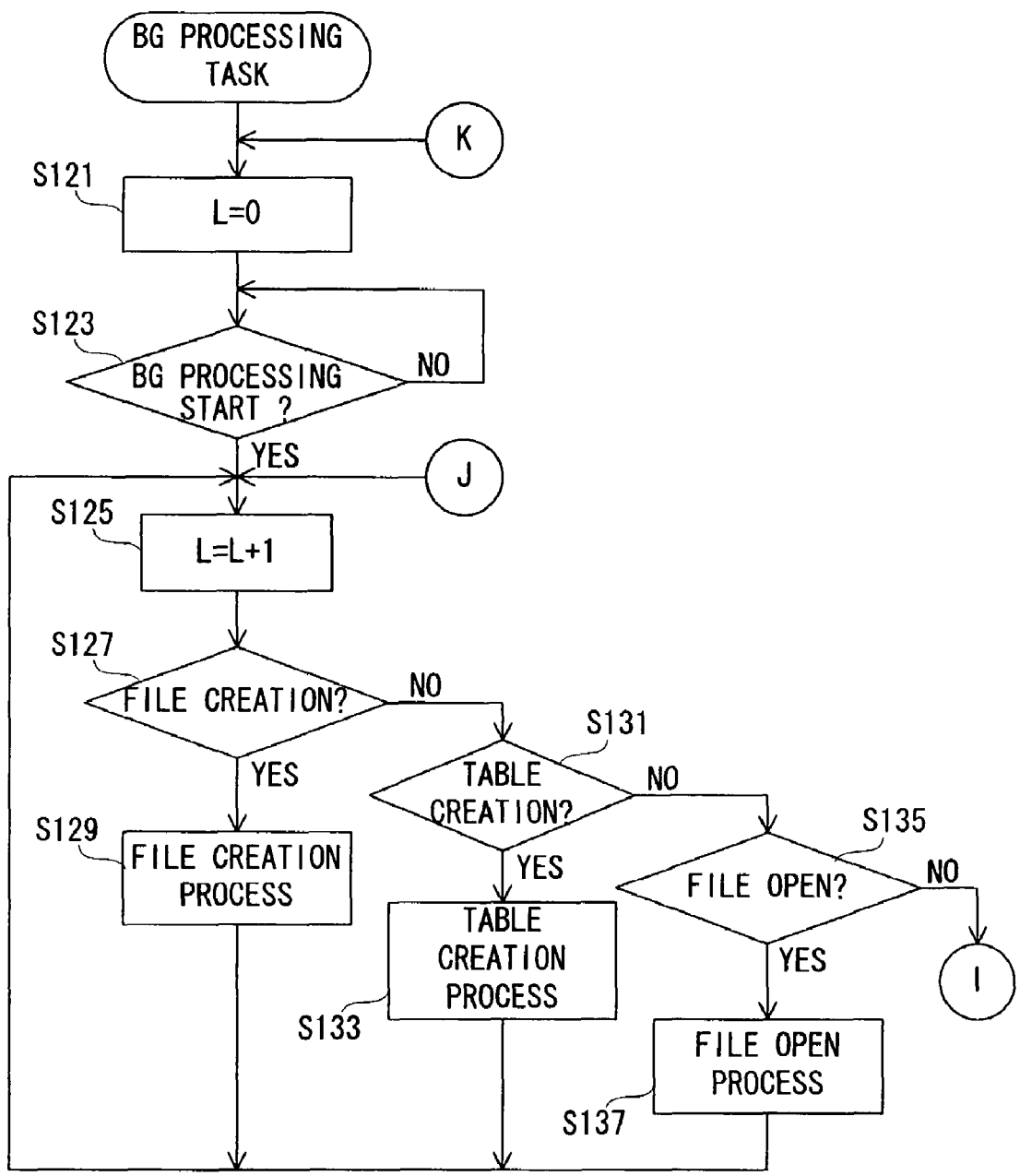
FIG. 20 is a flowchart showing a part of an operation of the CPU when a BG processing task is performed.
Figure 21:
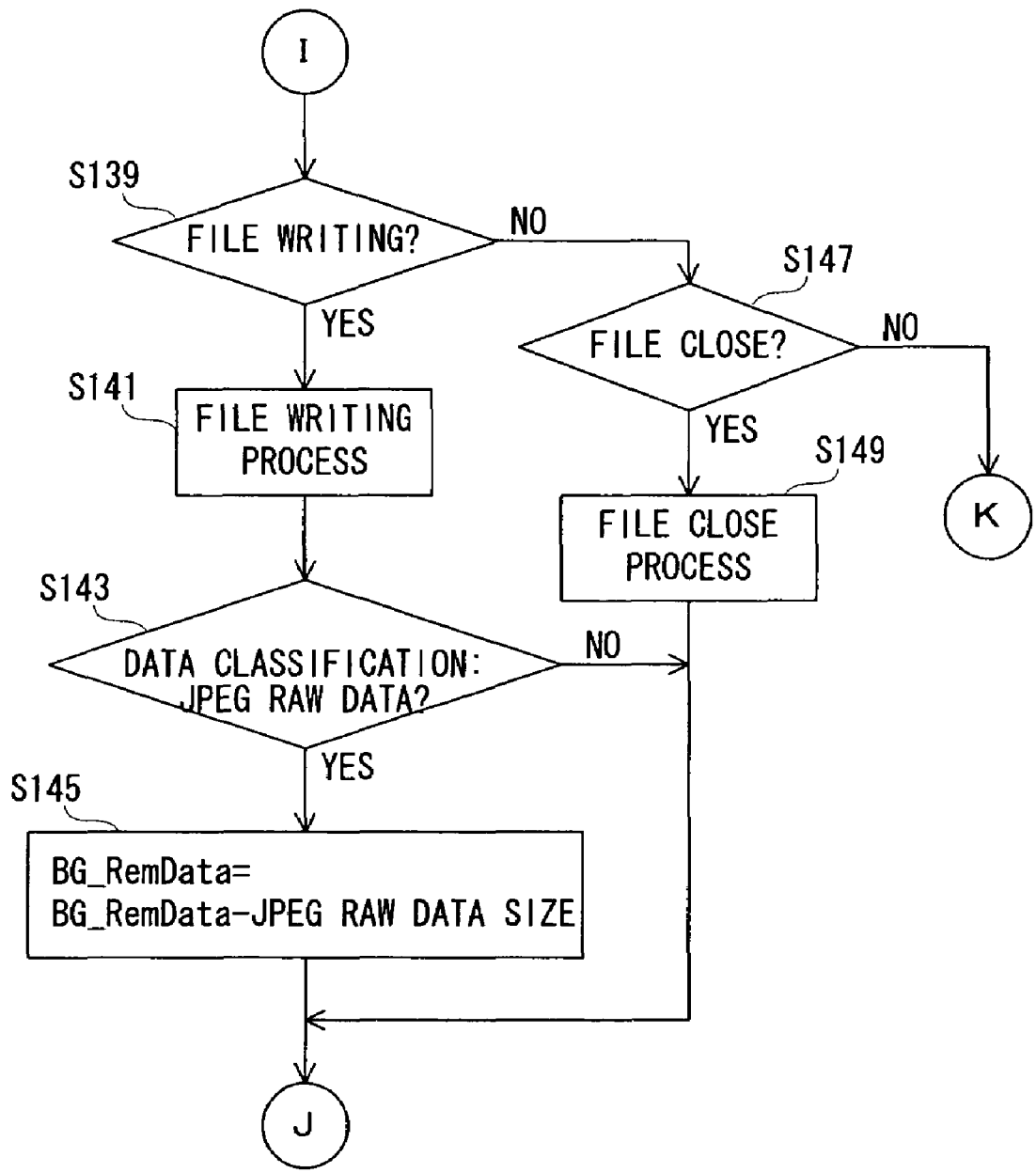
FIG. 21 is a flowchart showing another part of the operation of the CPU when the BG processing task is performed.

When the imaging mode is selected, the CPU 52 executes the imaging processing task shown in FIG. 13-FIG. 19 and the BG processing task shown in FIG. 20-FIG. 21 according to the control program stored in the ROM 54.

Figure 13:
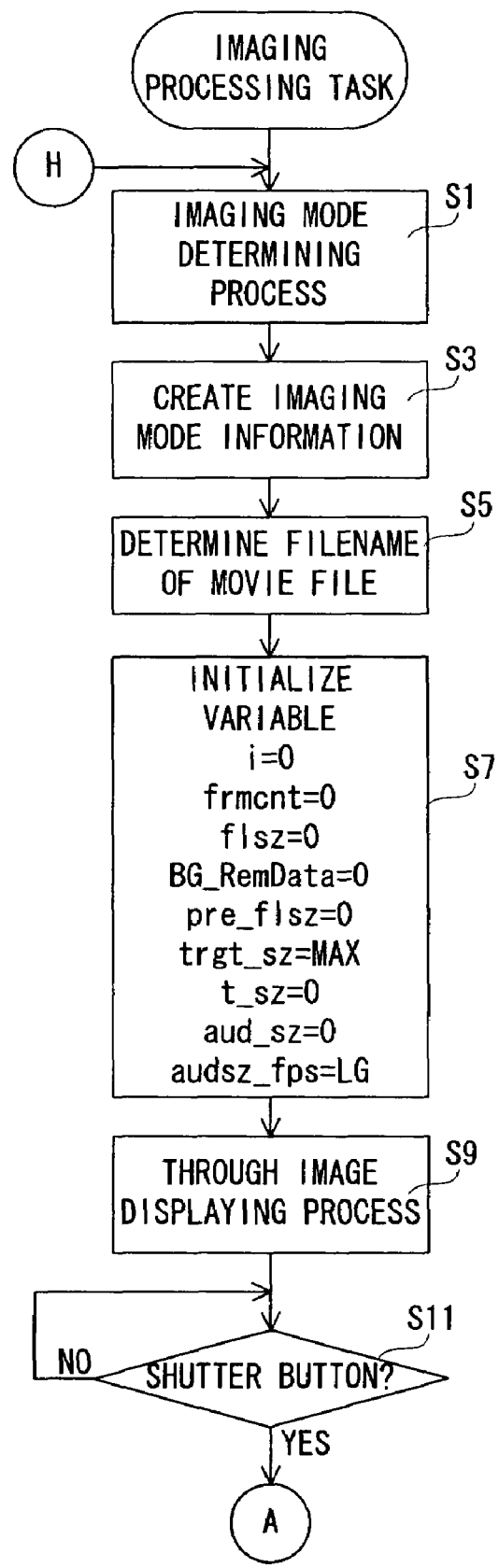
FIG. 13 is a flowchart showing a part of an operation of a CPU when an imaging processing task is performed.
Figure 14:
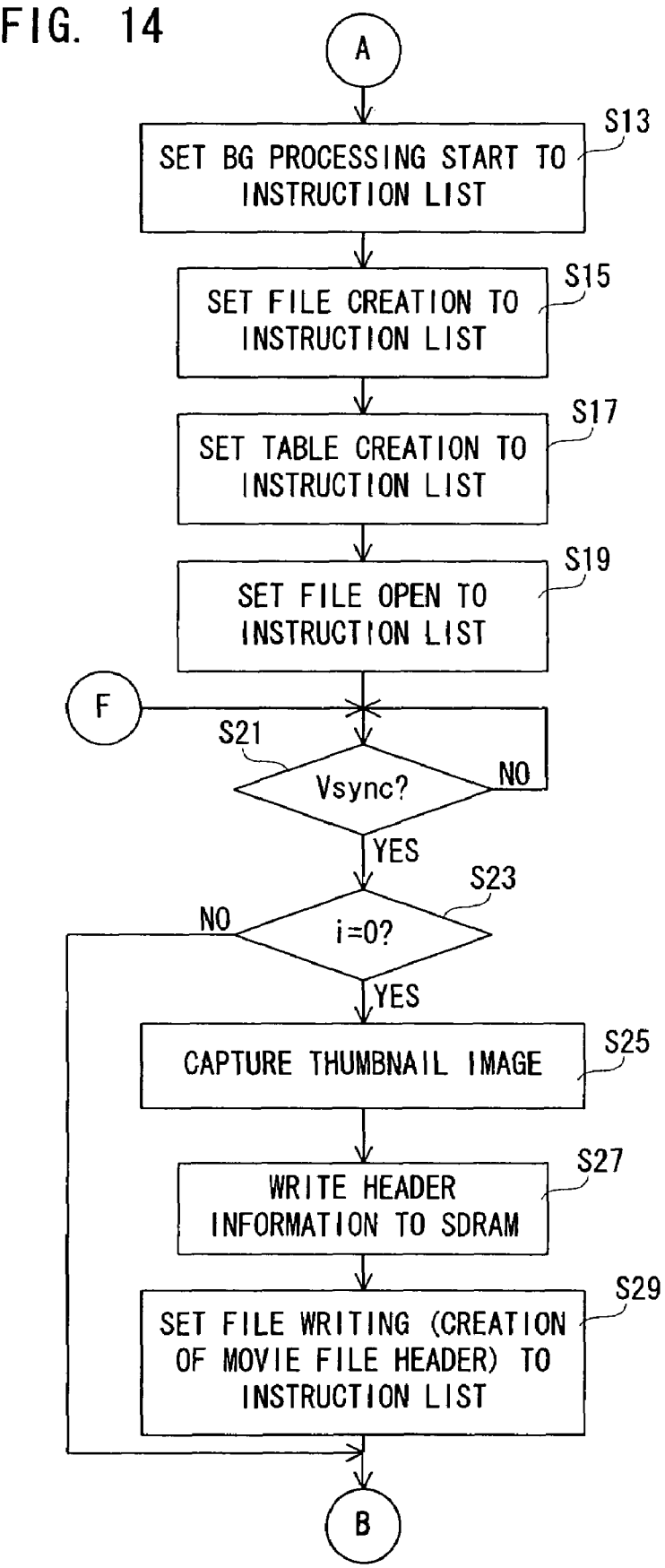
FIG. 14 is a flowchart showing another part of the operation of the CPU when the imaging processing task is performed.
Figure 15:
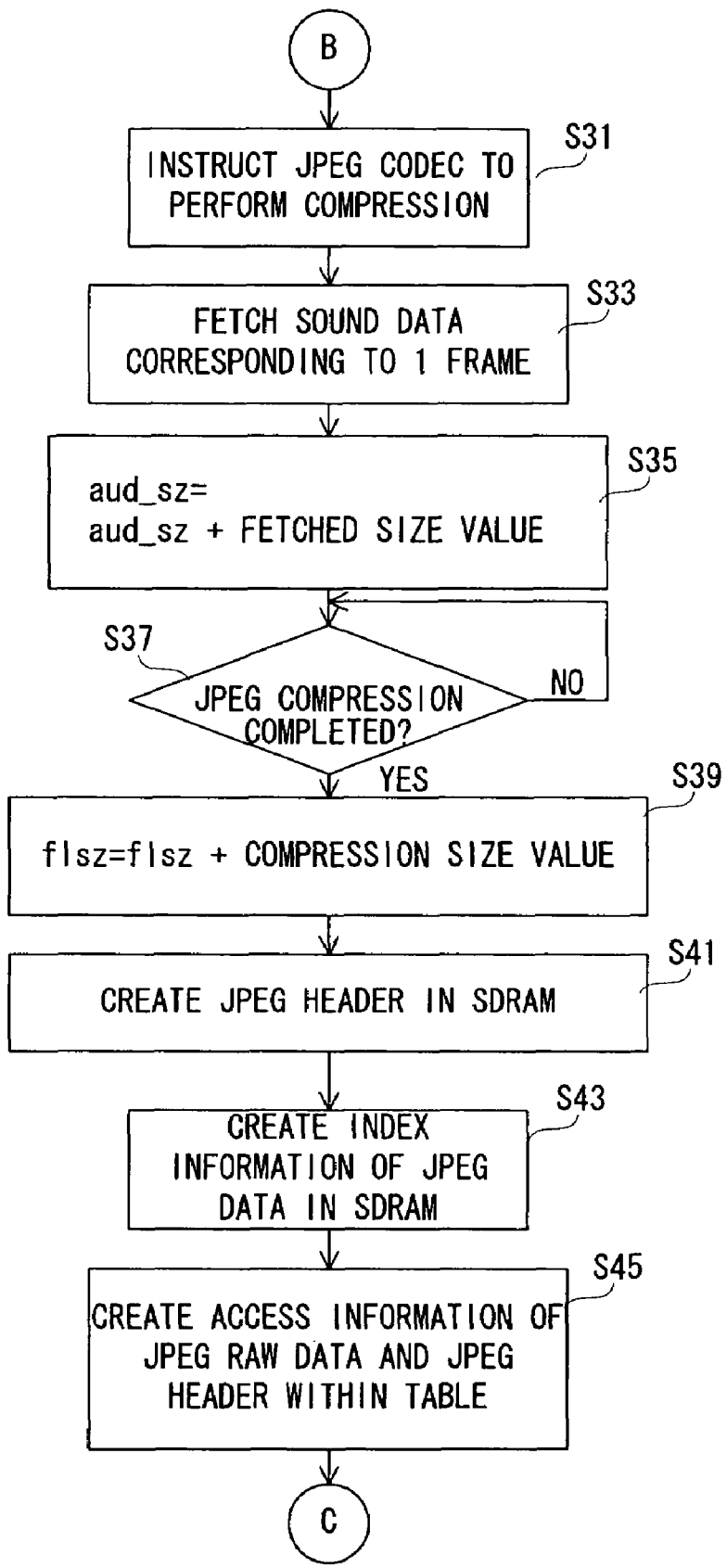
FIG. 15 is a flowchart showing the other part of the operation of the CPU when the imaging processing task is performed.
Figure 16:
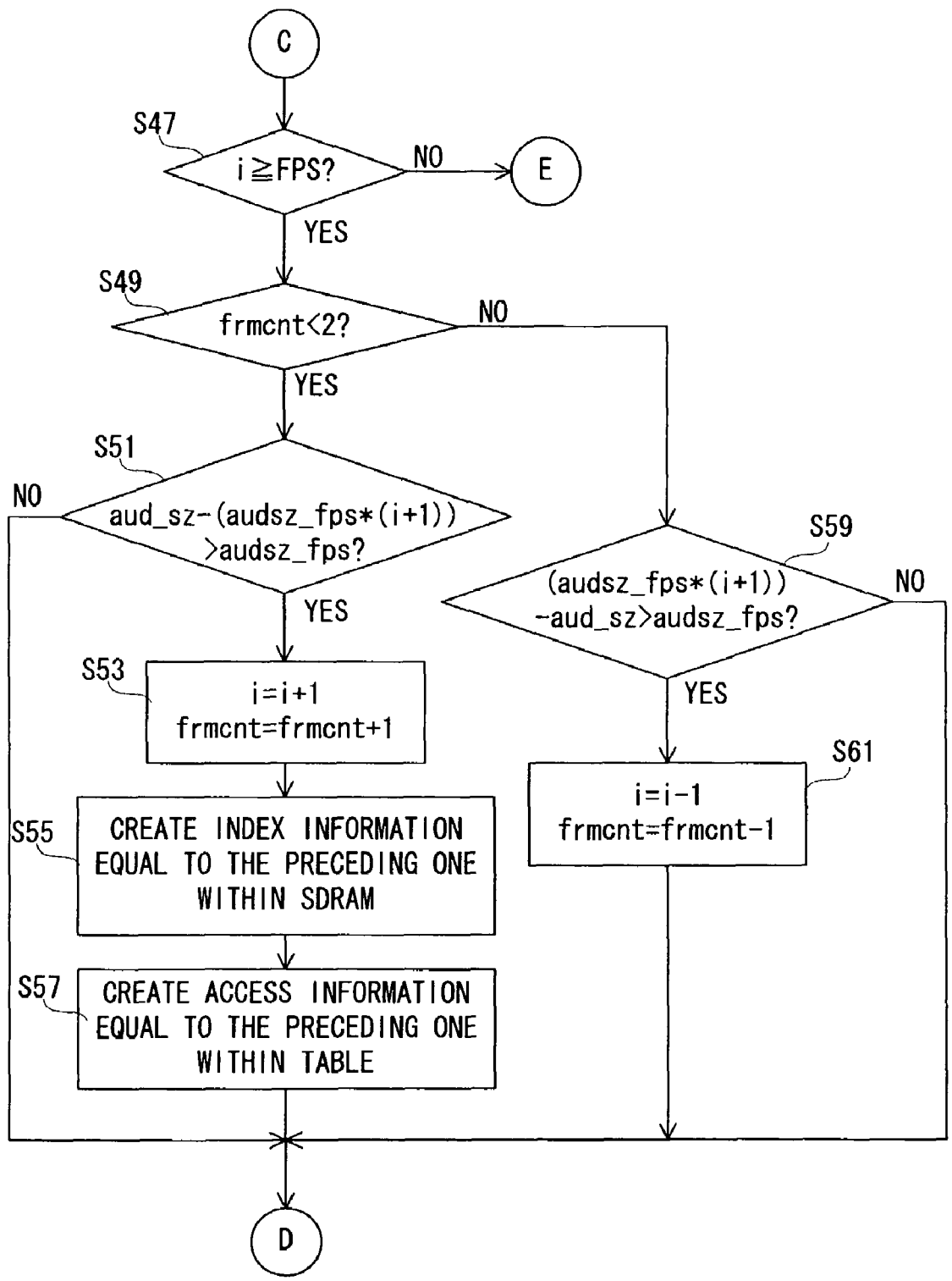
FIG. 16 is a flowchart showing a further part of the operation of the CPU when the imaging processing task is performed.
Figure 17:
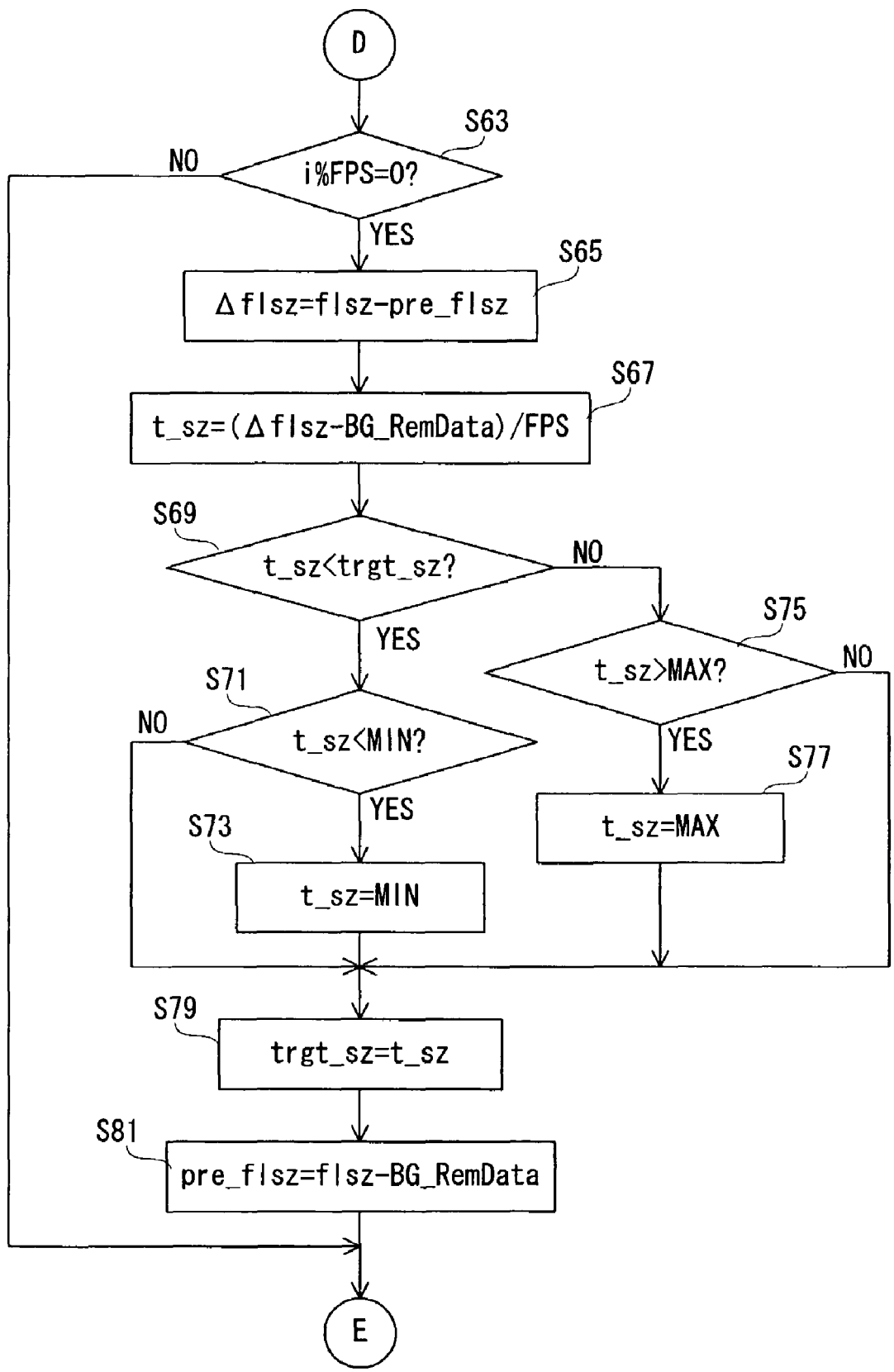
FIG. 17 is a flowchart showing another part of the operation of the CPU when the imaging processing task is performed.
Figure 18:
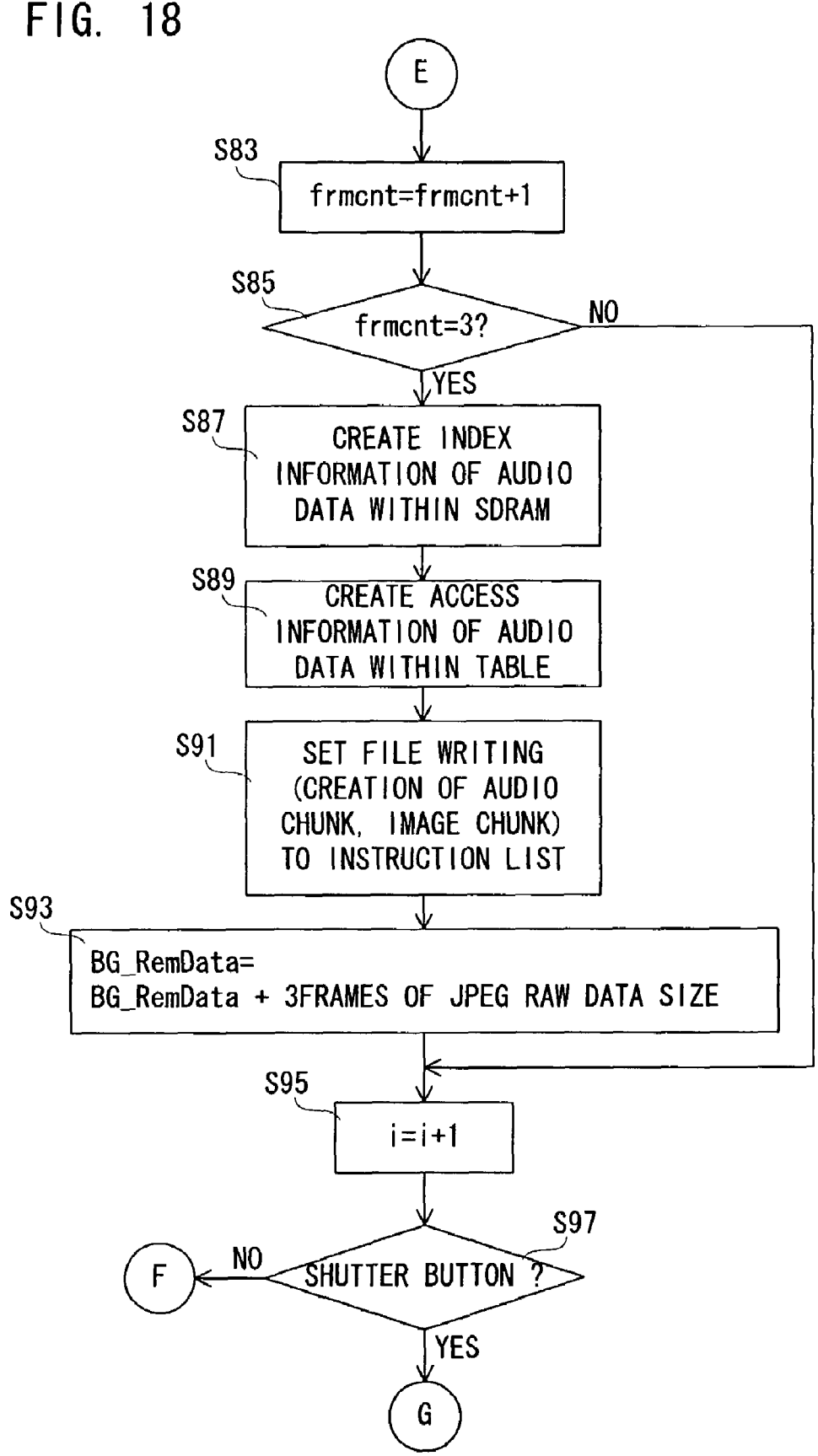
FIG. 18 is a flowchart showing the other part of the operation of the CPU when the imaging processing task is performed.
Figure 19:
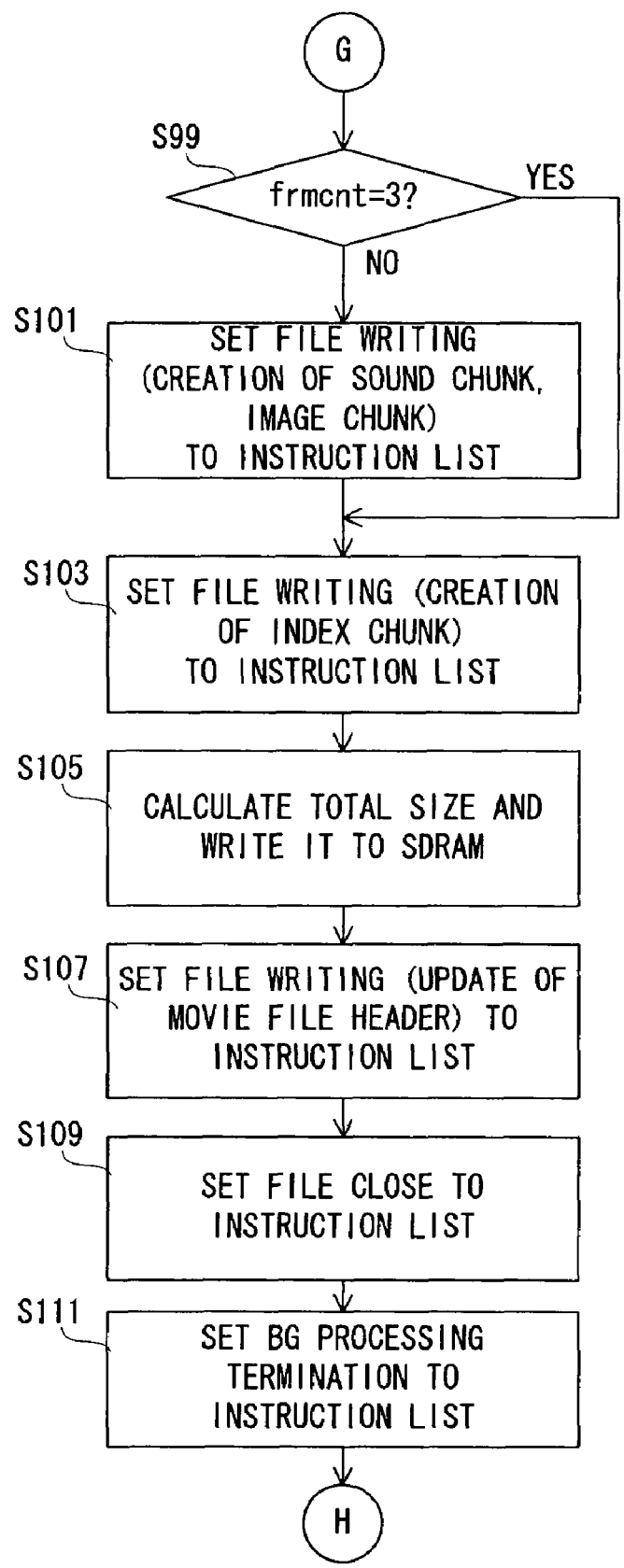
FIG. 19 is a flowchart showing a further part of the operation of the CPU when the imaging processing task is performed.

First, referring to FIG. 13, an imaging mode determining process is performed in a step S1. More specifically, a menu showing a plurality of imaging modes is displayed on the monitor 30, and a desired imaging mode is determined according to an operation of a menu key 52. When the imaging mode is determined, the process proceeds to a step S3 to create imaging mode information indicative of the determined imaging mode. The setting information is rendered, for example, "resolution: VGA", "frame rate: 30 fps", "audio system: monophonic", "bit rate: 8 bits", and "sampling rate: 8040 Hz". In a step S5, a filename of a movie file to be created by the current imaging processing task is determined. The filename is rendered, for example, "VCLP0003.MOV". The created/determined imaging mode information and filename are registered in the register rgst.

In a step S7, each of variables is initialized. More specifically, each of variables i, frmcnt, flsz, BG_RemData, pre_flsz, t_sz, and aud_sz is set to "0", a variable trgt_sz is set to a maximum value MAX, and a variable audsz_fps is set to a logical value LG.

Here, each of the variables i and frmcnt is a variable indicative of a frame number. The variable i is continuously incremented in response to a vertical synchronization signal, and the variable frmcnt is circularly updated between "0"-"3" in response to a vertical synchronization signal. Out of the numerical values "0"-"3" of the variable frmcnt, the actually important numerical value is "0"-"2". As described above, one image chunk is formed of three frames of JPEG data. The variable frmcnt is utilized for specifying what number in the image chunk the noticed JPEG data is.

The variable flsz is a variable indicative of the total size value of the JPEG raw data generated of the JPEG compression. The variable BG_RemData is a variable indicative of the size of the JPEG raw data for which an instruction of "file writing" is set to the instruction list 52a shown in FIG. 4, but that has not yet been recorded in the recording medium 50. The variable pre_flsz is a variable indicative of the total size value of the JPEG raw data that has already been recorded in the recording medium 50.

The variable trgt_sz is a variable indicative of the target size value when each frame of YUV data is compressed, and the variable t_sz is a variable to be utilized for calculating the target size value.

The variable aud_sz is a variable indicative of the total size value (byte) of the fetched audio data, and the variable audsz_fps is a variable indicative of the size value of the audio data corresponding to one frame. It is noted that the logical value LG set as the variable audsz_fps is the size value of the audio data corresponding to one frame determined on the basis of a sampling rate on a calculation by software. For example, if an actual sampling rate of the determined imaging mode is rendered 8043 Hz, the sampling rate on the calculation by the software is rendered 8040 Hz, and the logical value LG is rendered 268(=8040/30) bytes. The numerical value 8040 Hz is based on the facts that data transmission by hardware is executed by one word (=4bytes) unit, and the logical value LG can be represented by an integer.

In a step S9, a processing instruction is applied to each of the TG 14, the signal processing circuit 22 and the video encoder 28 to perform a through-image display. A through-image of the object is displayed on the monitor 30. When the shutter button 58 is depressed by the operator in a state that the through-image is displayed, "BG processing start", "file creation", "table creation" and "file open" are set to the list number "0"-"3" of the instruction list 52a shown in FIG. 4 in the steps S11-S19, respectively.

TABLE 1

| KIND | COMMAND | PARAMETER 1 | PARAMETER 2 | PARAMETER 3 | PARAMETER 4 |
|---|---|---|---|---|---|
| BG PROCESSING START | FILE_STRT | — | — | — | — |
| FILE CREATION | FILE_CREATE | DRIVE NUMBER | FILE PATH | — | — |
| TABLE CREATION | FILE_SET_ALLOC | DRIVE NUMBER | — | — | — |
| FILE OPEN | FILE_OPEN | DRIVE NUMBER | FILE PATH | — | — |
| FILE WRITING | FILE_WRITE | HANDLE NUMBER | SDRAM ADDRESS | SIZE (byte) | DATA KIND |
| FILE CLOSE | FILE_CLOSE | — | — | — | — |
| BG PROCESSING END | FILE_END | — | — | — | — |

Referring to the table 1, in "BG processing start", FILE_STRT is set as a command, and in "file creation", FILE_CREATE, a drive number (the number of drive for driving the recording medium 44), and a file path are set as the command, parameters 1 and 2, respectively. Furthermore, in "table creation", FILE_SET_ALLOC and a drive number are set as the command and the parameter 1, and in "file open", FILE_OPEN, a drive number and a file path are set as the command, the parameters 1 and 2. The size information and the filename determined in a step S25 are included in the file path set by "file creation", and the size information and the filename are written to the directory entry. It is noted that the movie file has not yet been completed, and therefore, the size information indicates "0".

When a vertical synchronization signal is output from the SG16 after completion of the process in the step S19, "YES" is determined in a step S21, and the value of the variable i is identified in a step S23. Here, if the variable i is equal to or more than "1", the process directly proceeds to a step S31 while if the variable i is equal to "0", the process proceeds to the step S31 through the processes in steps S25-S29.

In the step S25, a capturing process of a thumbnail image is performed. More specifically, a JPEG header Hth created by the CPU 52 is written to the SDRAM 26, and a thinning-out process and a compression process are respectively instructed to the signal processing circuit 22 and the JPEG codec 32.

The signal processing circuit 22 performs the thinning-out process on YUV data during one frame period, and writes thumbnail YUV data thus generated to the SDRAM 26 through the bus B1 and the memory control circuit 24. The JPEG codec 32 reads the thumbnail YUV data from the SDRAM 26 through the bus B1 and the memory control circuit 24, performs the JPEG compression process on the read thumbnail YUV data to generate JPEG raw data Rth, and writes the JPEG raw data Rth to the SDRAM 26 through the bus B1 and the memory control circuit 24. The JPEG header Hth and the JPEG raw data Rth are mapped on the SDRAM 26 as shown in FIG. 2.

In the succeeding step S27, header information Hinf including the above-described imaging mode information (resolution, frame rate, audio system, bit rate, sampling rate) is created, and the header information Hinf is written to the SDRAM 26 through the bus B1 and the memory control circuit 24. The header information Hinf is mapped above the JPEG header Hth as shown in FIG. 2.

When the header information Hinf, the JPEG header Hth and the JPEG raw data Rth forming the movie file header are thus stored in the SDRAM 26, "file writing" is set to the column of each of the list number "4" and "5" of the instruction list 52a shown in FIG. 4 in the step S29. As can be understood from the table 1, in "file writing", a FILE_WRITE, a handle number (obtained by a file open processing), an SDRAM address, a data size and a data classification are set as the command and the parameters 1, 2, 3 and 4. The reason why two "file writing" are set is the header information Hinf and the JPEG header Hth are continuous in the SDRAM 26, but the JPEG raw data Rth is stored in a separate position.

In the column of the list number "4", a start address of the header information Hinf is set as the SDRAM address, a total size of the header information Hinf and the JPEG header Hth is set as the data size, and "movie file header" is set as the data classification. Furthermore, in the column of the list number "5", a start address of the JPEG raw data Rth is set as the SDRAM address, a size of the JPEG raw data Rth is set as the data size, and a "movie file header" is set as the data classification. Thus, on the movie file header shown FIG. 8, the header information Hinf, the JPEG header Hth and the JPEG raw data Rth are successive in this order. It is noted that the JPEG data TH is formed of the JPEG header Hth and the JPEG raw data Rth as described above.

In the step S31, a compression processing instruction is applied to the JPEG codec 32. The compression processing instruction includes a target size value according to the variable trgt_sz. The JPEG codec 32 reads one frame of YUV data from the SDRAM 26 through the bus B1 and the memory control circuit 24, performs a compression process on the read YUV data to create JPEG raw data having a size being approximate to the target size, and writes the generated JPEG raw data to the SDRAM 26 through the bus B1 and the memory control circuit 24. The JPEG raw data is mapped on the SDRAM 26 as shown in FIG. 2. As described above, the JPEG data of the frame is formed of the JPEG header and the JPEG raw data obtained in the same frame, and the makers of SOI and EOI are written to the head and the end of the JPEG data.

In a step S33, a processing instruction is applied to the signal processing circuit 38 in order to perform a fetching process of the audio data corresponding to one frame. The signal processing circuit 38 writes the audio data corresponding to one frame that is applied from the A/D converter 36 and retained in the SRAM 38a to the SDRAM 26 through the bus B1 and the memory control circuit 24. The audio data is mapped on the SDRAM 26 as shown in FIG. 2. The signal processing circuit 38 further returns to the CPU 52 a fetched size value that is a size value of the audio data written to the SDRAM 26. Thus, in a step S35, an arithmetic operation according to the equation 1 is executed to accumulate the returned fetched size value to the variable aud_sz.

$$aud\_sz = aud\_sz + \text{fetched size value} \quad \text{[Equation 1]}$$

After completion of the arithmetic operation of the equation 1, it is determined whether or not the JPEG compression is completed in a step S37. The JPEG codec 32, after completion of the JPEG compression on the basis of the compression instruction in the step S31, returns a compressed size value that is a size value of the generated JPEG raw data and a compression termination signal to the CPU 46. Thus, when the compression termination signal is returned, "YES" is determined in the step S37.

In a step S39, an arithmetic operation of the equation 2 is executed in order to add the returned compressed size value to the variable flsz.

$$flsz = flsz + \text{compressed size value} \quad \text{[Equation 2]}$$

In a step S41, a JPEG header created by the CPU 52 is written to the SDRAM 26 through the bus B1 and the memory control circuit 24, and in a succeeding step S43, index information of the JPEG data of the current frame is written to the SDRAM 26 through the bus B1 and the memory control circuit 24. The JPEG header is mapped on the SDRAM 26 as shown in FIG. 2, and the index information is mapped on the SDRAM 26 as shown in FIG. 3.

As described above, in the index chunk of the movie file, the position on the file and the size of the JPEG data are managed for each frame. Thus, in the step S43, the position information and the size information of one frame of JPEG data are created as the index information. Furthermore, in the movie file, one image chunk is formed of three frames of JPEG data. Thus, in the step S43, what number the current frame is out of successive three frames is specified from the variable frmcnt, and whereby, which position the index information is to be created in the SDRAM 26 is determined.

In a step S45, the access information of the JPEG raw data and the JPEG header of the current frame is created within the access information table 52b shown in FIG. 5. That is, the head address information and the size information of the JPEG raw data of the current frame existing in the SDRAM 26 are created as the access information of the JPEG raw data of the current frame, and the head address information and the size information of the JPEG header of the current frame existing in the SDRAM 26 are created as the access information of the JPEG header of the current frame. Each of the created access information is assigned to the variable i set in the access information table 52b.

After completion of the process in the step S45, the variable i is compared to the frame rate value FPS of the current imaging mode in a step S47. If the frame rate of the current imaging mode is 30 fps, the frame rate value FPS becomes "30", and the variable i is compared to "30". Then, if i<FPS, the process directly proceeds to a step S83 while if i≧FPS, the process proceeds to a step S81 through the process in the steps S49-S81.

In the step S49, it is determined whether or not the variable frmcnt is less than "2", and if "YES", it is determined whether or not a condition of the equation 3 is satisfied in the step S51. On the other hand, if the variable frmcnt is equal to or more than "2", it is determined whether or not a condition of the equation 4 is satisfied in the step S59.

$$aud\_sz - (audsz\_fps*(i+1)) > audsz\_fps \quad \text{[Equation 3]}$$

$$(audsz\_fps*(i+1)) - aud\_sz > audsz\_fps \quad \text{[Equation 4]}$$

The aud_sz is a total size value of the audio data actually fetched, and the audsz_fps*(i+1) is a value obtained by multiplying the number of frames from the start of fetching by the logical value LG. In each of the equation 3 and the equation 4, a difference value between both the numerical values is compared to the logical value LG. As far as the difference value is equal to or less than the logical value LG, the process directly proceeds to the step S63 while if the difference value is above the logical value LG, the process proceeds to the step S63 through the steps S53-S57, or the step S61.

For example, if the actual sampling rate is 8043 Hz, and the sampling rate on the calculation by the software is 8040 Hz, the error between them is 3 Hz. Then, the error of 3 bytes occurs to the size value of the audio data corresponding to one second. Since the logical value LG is 268 bytes, the condition of the equation 3 is satisfied per about 90 seconds, and therefore, the processes in the steps S53-S57 are executed. Furthermore, if the actual sampling rate is 8034 Hz, and the sampling rate on the calculation by the software is 8040 Hz, the error between them is 6 Hz. At this time, the condition of the equation 4 is satisfied per about 45 seconds, and therefore, the process in the step S61 is executed.

In the step S53, each of the variables i and frmcnt is incremented. In the step S55, the image index information equal to the preceding one, that is, the index information equal to one created in the immediately preceding step S43 is created in the SDRAM 26, and in the step S57, the access information equal to the preceding one, that is, the access information equal to one created in the immediately preceding step S45 is created in the access information table 52b. After completion of the process in the step S57, the process proceeds to the step S63. On the other hand, in the step S61, each of the variables i and frmcnt is decremented, and then, the process proceeds to the step S63.

Accordingly, in a case that the condition shown in the equation 3 is satisfied, after the index information is set to the SDRAM 26 as shown in FIG. 9(A), and the access information is set to the access information table 52b as shown in FIG. 10(A), by the processes in the steps S53-S57, the index information of the same JPEG data is set to the SDRAM 26 as shown in FIG. 9(B), and the access information of the JPEG raw data and the JPEG header that form the same JPEG data is set to the access information table 52b as shown in FIG. 10(B).

According to FIG. 9(A), the index information of the JPEG data P is set to the SDRAM 26. In this state, the variable frmcnt is incremented, and the index information created in the immediately preceding step S43 is validated once again, and therefore, the index information of the JPEG data P is interpolated as shown in FIG. 9(B). After the index information of the JPEG data P is interpolated, the index information of the JPEG data P+1 is set as shown in FIG. 9(C).

According to FIG. 10(A), the access information of the JPEG raw data P and the JPEG header P are assigned to the variable i (=P). In this state, the variable i is incremented, and the access information created in the immediately preceding step S45 is validated once again, and therefore, the access information of the JPEG raw data P and the JPEG header P are assigned to the variable i (=P+1) as shown in FIG. 10(B). After the access information of the JPEG raw data P and the JPEG header P are interpolated, the access information of the JPEG raw data P+1 and the JPEG header P+1 are assigned to the variable i (=P+2) as shown in FIG. 10(C).

On the other hand, in a case that the condition shown in the equation 4 is satisfied, after the index information is set to the SDRAM 26 as shown in FIG. 11(A), and the access information is set to the access information table 52b as shown in FIG. 12(A), by the process in the step S61, a part of the index information is overwritten by the following index information as shown in FIG. 11(B), and a part of the access information is overwritten by the following access information as shown in FIG. 12(B).

According to FIG. 11(A), the index information of the JPEG data P and the index information of the JPEG data P+1 are set to the SDRAM 26. Since the variable frmcnt is decremented in this state, by the process in the step S43 at the next time, the index information of the JPEG data P+1 is overwritten with the index information of the JPEG data P+2 as shown in FIG. 11(B). Thus, the index information of the JPEG data P+1 is thinned-out. Next to the index information of the JPEG data P+2, the index information of the JPEG data P+3 is set as shown in FIG. 11(C).

According to FIG. 12(A), the access information of the JPEG raw data P and the JPEG header P, and the access information of the JPEG raw data P+1 and the JPEG header P+1 are set to the access information table 52b. Since the variable i is decremented in this state, by the process in the step S45 at the next time, the access information of the JPEG raw data P+1 and the JPEG header P+1 is overwritten with the access information of the JPEG raw data P+2 and the JPEG header P+2 as shown in FIG. 12(B). Thus, the access information of the JPEG data P+1 is thinned-out. Next to the access information of the JPEG raw data P+2 and the JPEG header P+2, the access information of the JPEG raw data P+3 and JPEG header P+3 are set as shown in FIG. 12 (C).

It is noted that the variable i is incremented in the step S53, and whereby, determination of "NO" is continued in the step S51 at and after the next time. Furthermore, the variable i is decremented in the step S61, and whereby, determination of "NO" is continued in the step S59 at and after the next time.

In the step S63, a remainder (=i% FPS) obtained by dividing the variable i by the frame rate value FPS is identified. Here, if the remainder is not "0", the process directly proceeds to the step S83 while if the remainder is "0", the process proceeds to the step S83 through the process in the steps S65-S81. Since the remainder becomes "0" every 30 frames, the process in the steps S65-S81 is executed per 30 frames.

In the step S65, the variables flsz and pre_flsz are subjected to an arithmetic operation according to the equation 5, and in the step S67, a difference value Δflsz obtained by the equation 5, the variable BG_RemData, and the frame rate value FPS are subjected to an arithmetic operation according to the equation 6.

$$\Delta flsz = flsz - pre\_flsz \quad \text{[Equation 5]}$$

$$t\_sz = (\Delta flsz - BG\_RemData)/FPS \quad \text{[Equation 6]}$$

In the equation 5, the variable flsz is the total size value of the JPEG raw data obtained by the JPEG compression, and the variable pre_flsz is the total size value of the JPEG raw data that has already been recorded in the recording medium 50. As described later, the variable pre_flsz is only updated every 30 frames, and the arithmetic operation according to the equation 5 is also updated every 30 frames, and therefore, the difference value Δflsz indicates the total size of the JPEG raw data generated in the newest 30 frames.

In the equation 6, the variable BG_RemData is a total size value of the JPEG raw data for which an instruction of "file writing" is set to the instruction list 52, but that has not yet been recorded in the recording medium 50. The shorter a time required for the "file writing" process is, the smaller the variable BG_RemData is while the longer a time required for "file writing" process is, the larger it is. A subtracted value obtained by subtracting the variable BG_RemData from the difference value Δflsz reflects a processing speed of "file writing" at this time, and a divided value obtained by dividing the subtracted value by the frame rate value FPS is a compressed size value in which an amount of changes of the variable BG_RemData at the current processing speed falls within a defined range. Such the compressed size value is calculated as a variable t_sz.

Here, as a variable factor of a processing speed of "file writing", an occupation rate of the bus B1 and a processing state of the task except for the BG processing task are conceivable other than the processing speed of the CPU 50a, and characteristics of the recording medium 50 such as a capacity of the buffer memory 50b.

As described above, when the zoom magnification larger than "1.0" is selected by an operation of the zoom key 64, raw image data is temporarily stored in the SDRAM 26, and then input to the signal processing circuit 22. At this time, the raw image data is applied to the SDRAM 26 via the bus B1, and returned to the signal processing circuit 22 via the bus B1. The occupation rate of the bus B1 is increased by a transfer process of the raw image data, and thus, this lowers the processing speed of "file writing".

Furthermore, when brightness and a tone are considerably changed by panning or tilting of the camera, the imaging condition controlling task is activated to adjust an aperture amount, an expose time period, a white balance adjustment gain, etc. Since the respective tasks cannot be simultaneously executed, when the imaging condition controlling task is activated, the BG processing task is interrupted, and whereby, the processing speed of "file writing" is lowered.

In this embodiment, taking the changes in the processing speed of "file writing" into account, the variable t_sz is periodically updated. As a result of updating the variable t_sz, the target size value and, in turn, the JPEG compression ratio are updated as described later.

In the step S69, the calculated variable t_sz is compared to the variable trgt_sz, and if t_sz<trgt_sz, the variable t_sz is compared to a minimum value MIN in the step S71. Then, if t_sz≧MIN, the process directly proceeds to the step S79 while if t_sz<MIN, the variable t_sz is updated to the minimum value MIN in the step S73, and then, the process proceeds to the step S79. On the other hand, if it is determined to be t_sz≧trgt_sz in the step S69, the variable t_sz is compared to a maximum value MAX in the step S75. Then, if t_sz≦MAX, the process directly proceeds to the step S79 while if t_sz>MAX, the variable t_sz is updated to the maximum value MAX in the step S77, and then, the process proceeds to the step S79. In the step S79, the variable t_sz is set as the variable trgt_sz.

According to the equation 6, when the variable BG_RemData is large, the variable t_sz is small while when the variable BG_RemData is small, the variable t_sz is large. Therefore, "t_sz<trgt_sz" means that a large amount of the JPEG data that has not yet been recorded exist, that is, a processing speed of "file writing" is low. Furthermore, "t_sz≧trgt_sz" means that a small amount of the JPEG data that has not yet been recorded exist, that is, characteristics of the recording medium 50 is superior.

Here, when the variable t_sz is below the variable trgt_sz, the variable t_sz is set as the variable trgt_sz in order to validate a smaller target size value (higher JPEG compression ratio) during successive one second. Thus, the size of the JPEG data generated during a successive one second is smaller than the size of the JPEG data generated during the current one second, and fail of the process due to the decrease in the processing speed of "file writing" is prevented.

On the other hand, when the variable t_sz is equal to or more than the variable trgt_sz, the variable t_sz is set to the variable $trgt_{13}sz$ in order to validate a larger target size value (lower JPEG compression ratio) during the successive one second. Thus, the size of the JPEG data generated during the successive one second is larger than the size of the JPEG data generated during the current one second, and deterioration of image quality due to the compression process is prevented.

In the step S81, the variable flsz and BG_RemData is subjected to an arithmetic operation according to the equation 7 to update the variable pre_flsz.

$$pre_{13}flsz = flsz - BG\_RemData \qquad [\text{Equation 7}]$$

According to the equation 7, the total size value of the JPEG raw data that has not yet been recorded is subtracted from the total size value of the JPEG raw data generated by now. The arithmetic operation is also executed every 30 frames, and therefore, the variable pre_flsz is updated every 30 frames. In the arithmetic operation of the equation 5 at the nex time, that is, after the thirty frames, the variable pre_flsz thus updated is subtracted from the newest variable flsz.

The variable frmcnt is incremented in the step S83, and the value of the incremented variable frmcnt is identified in a succeeding step S85. Then, if the variable frmcnt is "1" or "2", the process directly proceeds to a step S95 while the variable frmcnt is "3", the process proceeds to the step S95 through the process in steps S87-S93.

In the step S87, the index information of the audio data is written to the SDRAM 26. In the movie file shown FIG. 7, one audio chunk is formed of the audio data corresponding to three frames of time period. In the index chunk, the position in the file and the size of the audio data are managed every time period corresponding to three frames. Thus, in the step S85, the position information and the size information of the audio data corresponding to the newest three frames are created, and the created index information are written to the SDRAM 26 as shown FIG. 3.

In the succeeding step S89, the access information of the audio data is written to the access information table 52b. That is, the head address information and the size information of the audio data corresponding to three frames that exist in the SDRAM 26 are created as the access information, and the created access information is written to the access information table 52b. At this time, the access information is related to the access information of the JPEG data of the noticed three frames.

In the step S91, "file writing" is set to the instruction list 52a shown in FIG. 4 referring to the access information of three frames of the JPEG raw data and three frames of the JPEG header, and the access information of the audio data corresponding to three frames that are set in the access information table 52b. As shown in FIG. 2, the audio data corresponding to three frames is successive in the SDRAM 26, but three frames of the JPEG raw data and the JPEG header are discretely distributed on the SDRAM 26. Thus, in the step S91, a total of seven "file writing" is set to the instruction list 52a.

In "file writing" set to be first out of the seven "file writing", the SDRAM address indicates a start address of the audio data corresponding to the noticed three frames, the data size indicates a size of the audio data corresponding to the noticed three frames, and the data classification indicates audio chunk. Here, the start address and the data size are equal to the SDRAM address and the data size constituting the access information created in the step S87.

In "file writing" set to be the second, the forth, and the sixth, the SDRAM address indicates a start address of the JPEG header of each of the noticed three frames, the data size indicates a size of the JPEG header of each of the noticed three frames, and the data classification indicates JPEG header. Here, the start address and the data size are equal to the SDRAM address and the data size constituting the access information of the JPEG header of each of the newest three frames created in the step S45 or S57.

In "file writing" set to be third, fifth and seventh, the SDRAM address indicates a start address of the JPEG raw data of each of the noticed three frames, the data size indicates a size of the JPEG raw data of each of the noticed three frames, and the data classification indicates JPEG raw data. Here, the start address and the data size are equal to the SDRAM address and the data size constituting the access information of the JPEG raw data of each of the newest three frames created in the step S45 or S57.

Such instructions in the instruction list 52*a* are executed by the BG processing task, and whereby, the audio data corresponding to three frames and the JPEG data corresponding to three frames are read-out from the SDRAM 26 by the memory control circuit 24, and applied to the recording medium 50 through the bus B1 and the I/F circuit 46. Consequently, the audio chunk and the image chunk are alternately distributed in the movie file shown in FIG. 8.

In the step S93, an arithmetic operation of the equation 8 is executed in order to add the size values of three frames of the JPEG raw data set in the instruction list 52*a* in the step S91 to the variable BG_Rem Data.

$$BG\_RemData = BG\_RemData + \text{size values of JPEG raw data} \quad \text{[Equation 8]}$$

In the step S95, the frame number i is incremented, and in a succeeding step S97, it is determined whether or not the shutter button 58 is operated. As far as the shutter button 58 is not depressed, the process from the step S21-S95 is repeated, and the JPEG header, the JPEG raw data and the audio data generated for each frame are mapped on the SDRAM 26 as shown in FIG. 2.

When the shutter button 58 is depressed, the process proceeds to a step S99 to determine the value of the variable frmcnt. Here, if the variable frmcnt is "3", the process directly proceeds to a step S103 while if the variable frmcnt is "1" or "2", "file writing" is set to the instruction list 52*a* in a step S101, and then, the process proceeds to the step S103.

In a case that the variable frmcnt is "1", the last audio chunk and image chunk are respectively formed of one frame of audio data and JPEG data, and a total of three "file writing" is set to the instruction list 52*a*. In a case that the variable frmcnt is "2", the last audio chunk and image chunk are respectively formed of two frames of audio data and JPEG data, and a total of five "file writing" is set to the instruction list 52*a*. Thus, the audio chunk consisting of one frame or two frames of audio data and the image chunk consisting of one frame or two frames of JPEG data are formed in the movie file.

In the step S103, "file writing" is set to the instruction list 52*a* in order to write the index information shown in FIG. 3 to the movie file. The SDRAM address and the data size set here indicate the start address and the total size of the index information shown in FIG. 3, and the data classification indicates movie file header. "File writing" is executed by the BG processing, and whereby, the index chunk including all the index information shown in FIG. 3 is formed at the end of the movie file.

In a step S105, the total size of the movie file is calculated on the basis of the size information included in the index information, and the calculated total size data is written to the SDRAM 26. In succeeding steps S107-S111, "file writing", "file close" and "BG processing termination" are set to the instruction list 52*a*. The SDRAM address and the data size set by "file writing" indicate the head address and the data size of the total size data, and the data classification indicates movie file header. Furthermore, in "file close", FILE_CLOSE is set as a command, and in "BG processing termination", FILE_END is set as a command.

"File writing" is executed by the BG processing, and whereby, a total size value is added to the size information of the movie file header. Furthermore, "file close" is executed by the BG processing, and whereby, the size information of the directory entry (size information written on the basis of the process in the step S15) is updated from "0" to the total size value, and the FAT information in the FAT area 501*c* is updated such that a link is formed among the writing area of the movie file currently created. The BG processing is terminated by the "BG processing termination".

It is noted that it is necessary to update a writing destination address in order to write the total size value to the movie file header, and actually, before setting "file writing" in the step S105, "seek processing" is set to the instruction list 52*a*.

The BG processing task complies with a flowchart shown in FIG. 20-FIG. 21. First, a list number L of a read destination is set to "0" in a step S121, and it is determined whether or not a command read from the list number L is FILE_STRT in a succeeding step S123. If "YES" here, the list number L is incremented in a step S125, and the content of the command read from the incremented list number L is determined in each of steps S127, S131, S135, S139, and S147.

If the read command is FILE_CREATE, "YES" is determined in the step S127, and a file creating process is performed in a step S129. More specifically, the recording medium 50 is specified by the drive number set in the parameter 1, and the filename and the size information indicative of size 0 are written to the directory entry of the recording medium 50 on the basis of the file path set to the parameter 2. After completion of the process, the process returns to the step S125.

If the read command is FILE_SET_ALLOC, "YES" is determined in the step S131, and a table creating process is performed in the step S133. That is, the recording medium 50 is specified by the drive number set in the parameter 1, and the free area table 52*c* shown FIG. 7 is created referring to the FAT information. After completion of the process, the process returns to the step S125.

If the read command is FILE_OPEN, the process proceeds from the step S135 to a step S137 to perform a file opening process. That is, the recording medium 50 is specified by the drive number set to the parameter 1, a file is specified on the basis of the file path set to the parameter 2, and a handle number to be assigned to the file is created. The created handle number is utilized for the imaging processing. After completion of the process, the process returns to the step S125.

If the read command is FILE_WRITE, the process proceeds from the step S139 to a step S141 to perform a file writing process. More specifically, a movie file of a writing destination is specified by the handle number set to the parameter 1, and a reading start address and a reading size are respectively specified according to the SDRAM address and the data size set to the parameters 2 and 3. Then, data is read from the SDRAM 26 by a word unit on the basis of the reading start address and the reading size, and the read data is applied to the CPU 50*a* of the recording medium 50 together with the movie file information of the write destination.

If the read size set to the parameter 3 is larger than the buffer memory 50*b* provided in the recording medium 50, a BUSY signal is returned to the CPU 52 form the CPU 50*a* at a time that the buffer memory 50*b* becomes full. The process in the step S141 is suspended in response to the BUSY signal. When the buffer memory 50*b* has an enough free area owing to the data transfer from the buffer memory 50*b* to the hard disk 50*c*, a READY signal is returned to the CPU 52 from the CPU 50*a*. The process in the step S141 is restarted in response to the READY signal.

After completion of transferring the data corresponding to the read size set to the parameter 3 to the recording medium 50, the read size is accumulated, and the FAT information indicative of a link state of the written cluster is created every time that one cluster of writing is completed. The accumulated value of the data size and the FAT information are retained in the SDRAM 26.

In a step S143, the data classification set in the parameter 4 is determined. Here, if the data classification is not "JPEG raw data", the process directly returns to the step S125 while if the data classification is "JPEG raw data", an arithmetic operation according to the equation 9 is executed in a step S145, and then, the process returns to the step S125.

$$BG\_RemData = BG\_RemData - \text{size value of JPEG raw data} \quad \text{[Equation 9]}$$

According to the equation 9, the data size set to the parameter 3 is subtracted from the variable BG_RemData. Thus, the variable BG_Rem Data indicates a size of the JPEG raw data that has been set to the instruction list 52*a*, but has not yet been recorded in the recording medium 50.

If the read command is FILE_CLOSE, the process proceeds from the step S147 to a step S149 to perform a file closing process. More specifically, the size information assigned to the filename of the opened movie file is updated by the total size value retained in the SDRAM 26, and the FAT information in the FAT area 501*c* is updated by the FAT information retained in the SDRAM 26. After completion of the process, the process returns to the step S125.

If the read command is FILE_END, "NO" is determined in the step S147, and then, the process returns to the step S121. The BG process is shifted to a wait state.

As can be understood from the above-description, the plurality of frames of YUV data forming a motion image is recorded in a compressed manner in the recording medium 50 under the control of the CPU 52 mounting a multitasking OS. Here, the plurality of tasks to be executed by the CPU 52 includes an imaging processing task in relation to a compression process of the YUV data of the plurality of frames, and a BG processing task in relation to a recording process of the JPEG data of the plurality of frames. Furthermore, the imaging processing task includes a determining process for periodically determining a recording processing speed of the JPEG data (S63) and a changing process for changing the compression ration of the YUV data on the basis of the determination result (S79).

In the multitasking OS, the plurality of tasks are executed only in a time division manner. Then, according to load changes of each of the tasks, the recording processing speed of the JPEG data is also changed. Furthermore, the zoom circuit 22*a*, when an enlargement zooming is selected by the zoom key 64, writes row image data to the SDRAM 26 through the bus B1 and the memory control circuit 24, reads a part of the raw image data through the bus B1 and the memory control circuit 24, and is subjected to the enlargement zooming on the read raw image data. Thus, even when the enlargement zooming is selected, due to reduction in an occupation rate of the bus B1, the recording processing speed is lowered. This is the reason why in this embodiment, the recording processing speed is periodically determined, and the compression ratio of the YUV data is changed according to a determination result. This, it is possible to control a successive recordable time of the motion image.

It is noted that although the image compression is performed in accordance with the JPEG format in this embodiment, it may be possible that the MPEG format is adopted in place of the JPEG format, and the target size value is updated by a GOP unit.

Furthermore, in this embodiment, the target size value is updated every 30 frames. However, in order to easily perform the calculation by software, the target size may be updated every the number of frames corresponding to power of two such as 32 frames, 64 frames, 128 frames, etc.

In addition, although the threshold value for determining whether or not the number of frames is to be adjusted is set to an amount of audio data corresponding to one frame (=268 bytes) in this embodiment, the threshold value may be an integral multiple of 268 bytes.

Furthermore, although the number of frames of the JPEG data is adjusted at a time of performing the recording process in this embodiment, the adjustment of the number of frames may be performed at a time of performing the reproduction process.

Furthermore, although the thinning-out/interpolation is performed on both of the access information and the index information in this embodiment, the thinning-out/interpolation may be performed on only the index information in a case of controlling a reproduction order of the JPEG data on the basis of only the index information. Thus, it is possible to eliminate omission of the JPEG data due to the thinning-out process of the access information.

In addition, although the FAT format is adopted as a recording format of a motion image signal in this embodiment, the UDF (Universal Disk Format) format may be adopted in place of this.

Furthermore, although a description is made by use of the digital video camera in this embodiment, it is needless to say that the present invention is applicable to a fixed-typed hard disk recorder, for example, for recording a TV program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion image recording apparatus which comprises a processor mounting a multitasking OS, and records a plurality of screens of image data forming a motion image signal in a compressed manner in a recording medium, wherein a plurality of tasks to be executed by said processor includes a first task in relation to a compression process of image data, and a second task in relation to a recording process of compressed image data, said first task includes an adding process for adding, to a predetermined parameter value, a value corresponding to a size of the compressed image data equivalent to a first number of screens, every time that image data corresponding to said first number of screens is compressed, said second task includes a subtracting process for subtracting, from said predetermined parameter value, a value corresponding to a size of the compressed image data equivalent to a second number of screens, every time that compressed image data corresponding to said second number of screens is recorded, and said first task includes a changing process for changing a compression ratio of the image data such that said compression ratio becomes higher as said predetermined parameter value becomes larger;

wherein, when another task is executed, the second task is interrupted each time that a transmission by the defined amount is completed.

2. A motion image recording apparatus according to claim 1, wherein said second task further includes a transmission process for transmitting the compressed image data by a defined amount to a recording medium.

3. A motion image recording apparatus according to claim 1, further comprising a fetching means for fetching said plurality of screens of image data according to a fetching condition, wherein said plurality of tasks include a third task in relation to an adjustment of said fetching condition.

4. A motion image recording apparatus according to claim 3, wherein said fetching means includes an imaging means for imaging an object, and said fetching condition includes an imaging condition of said imaging means.

5. A motion image recording apparatus according to claim 1, wherein said predetermined parameter value is an accumulated value of a size of the compressed image data.

6. A motion picture recording apparatus according to claim 1, wherein said predetermined parameter value indicates a size of image data that has been compressed, but has not yet been recorded.

7. A motion image recording apparatus with compression ratio control, comprising:
- a fetcher for fetching a plurality of screens of image data forming a motion image;
- a compressor for compressing the image data of each of screens fetched by said fetcher with reference to a target size;
- a recorder for recording compressed image date generated by said compressor in a recording medium;
- a first detector for detecting a first size value indicative of a total size of the compressed image data corresponding to a newest predetermined number of screens;
- a second detector for detecting a second size value indicative of a total size of the compressed image data that has already been created by said compressor and has not yet been recorded by said recorder;
- a divider for dividing a difference value obtained by subtracting said second size value from said first size value by said predetermined number to obtain a divided value; and
- a setter for
  setting the divided value as said target size when the divided value obtained by said divider falls between a first preset value and a second preset value that is larger than the first preset Value,
  setting said first preset value as said target size when the divided value obtained by said divider is below said first preset value, and
  setting said second preset value as said target size when the divided value obtained by said divider is above the second preset value.

8. A motion image recording apparatus according to claim 7, comprising:
- a bus to be utilized for transmitting the image data and the compressed image data;
- a memory for storing the image data and the compressed image data that are transmitted through said bus;
- a zooming means for performing an electric zooming process on the image data; and
- a selecting means for arbitrarily selecting a zooming manner of said zooming means, wherein said zooming means, when an enlargement zooming is selected by said selecting means, extracts a part of the image data by use of said memory, and performs the enlargement zooming on the extracted motion image data.

9. A motion picture recording apparatus according to claim 7, wherein the compressor compresses the image data to a size approximately equal to the target size.

\* \* \* \* \*